(12) United States Patent
Kajita et al.

(10) Patent No.: US 9,359,060 B2
(45) Date of Patent: Jun. 7, 2016

(54) LAMINATED COMPOSITE RADIUS FILLER WITH GEOMETRIC SHAPED FILLER ELEMENT AND METHOD OF FORMING THE SAME

(71) Applicant: The Boeing Company, Chicago, IL (US)

(72) Inventors: Kirk B. Kajita, Newcastle, WA (US); Douglas A. Frisch, Renton, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/074,692

(22) Filed: Nov. 7, 2013

(65) Prior Publication Data

US 2015/0125655 A1    May 7, 2015

(51) Int. Cl.
*B64C 1/06* (2006.01)
*B32B 3/26* (2006.01)
(Continued)

(52) U.S. Cl.
CPC ............... *B64C 1/064* (2013.01); *B29C 70/34* (2013.01); *B29D 99/0003* (2013.01); *B32B 3/266* (2013.01); *B32B 3/28* (2013.01);
(Continued)

(58) Field of Classification Search
CPC .. Y02T 50/433; B29C 65/00; B29C 66/7212; B29C 66/43; B29C 66/71; B29C 66/1122; B29C 66/721; B29C 2793/0009; B29C 70/30; B64C 2001/0072; B64C 1/06; B64C 1/064; B29D 99/0003; B29D 99/001; B32B 3/266; B32B 3/28; B32B 38/0012; B29L 2031/3082; Y10T 428/24314; Y10T 428/24529

USPC ............... 428/60, 73, 99, 109, 113, 119, 156, 428/223; 264/211.12, 216, 223; 244/123.5–123.6

See application file for complete search history.

(56) References Cited

U.S. PATENT DOCUMENTS

| 4,331,723 | A | 5/1982 | Hamm |
| 4,789,594 | A | 12/1988 | Stawski |

(Continued)

FOREIGN PATENT DOCUMENTS

| WO | WO01/62495 A2 | 8/2001 |
| WO | WO2012/158301 A1 | 11/2012 |

OTHER PUBLICATIONS

Extended European Search Report, mailed Mar. 25, 2015, for counterpart EP application EP14187241.6-1706, Applicant The Boeing Company, 4 pages.

(Continued)

*Primary Examiner* — Prashant J Khatri
*Assistant Examiner* — Travis Figg

(57) ABSTRACT

A laminated composite radius filler for a composite structure has a stacked ply assembly having a plurality of stacks of laminate radius filler plies cut to a desired width and having a desired ply orientation. The laminated composite radius filler further has a geometric shaped filler element positioned at a desired location on a first portion of the stacked ply assembly. The geometric shaped filler element deforms a second portion of the stacked ply assembly stacked over the geometric shaped filler element, such that the laminate radius filler plies of the second portion of the stacked ply assembly change direction and have a component of direction including a horizontal direction and a vertical direction. The laminated composite radius filler having a shape substantially corresponding to a radius filler region of the composite structure.

26 Claims, 8 Drawing Sheets

(51) Int. Cl.
  *B32B 3/28* (2006.01)
  *B32B 38/00* (2006.01)
  *B29C 70/34* (2006.01)
  *B29D 99/00* (2010.01)
  *B29L 31/30* (2006.01)

(52) U.S. Cl.
  CPC .... *B32B 38/0012* (2013.01); *B29L 2031/3082* (2013.01); *Y02T 50/433* (2013.01); *Y10T 156/10* (2015.01); *Y10T 156/1002* (2015.01); *Y10T 428/24314* (2015.01); *Y10T 428/24529* (2015.01)

(56) References Cited

U.S. PATENT DOCUMENTS

| | | | |
|---|---|---|---|
| 5,639,535 A * | 6/1997 | McCarville | B29C 70/30 156/182 |
| 5,833,786 A | 11/1998 | McCarville et al. | |
| 6,562,436 B2 | 5/2003 | George et al. | |
| 6,689,448 B2 | 2/2004 | George et al. | |
| 6,709,538 B2 | 3/2004 | George et al. | |
| 7,531,058 B2 | 5/2009 | Grose et al. | |
| 7,823,490 B2 | 11/2010 | Evans et al. | |
| 7,874,829 B2 | 1/2011 | Kirkendall | |
| 8,084,114 B2 | 12/2011 | Grose et al. | |
| 8,132,487 B2 | 3/2012 | Evans et al. | |
| 2002/0031641 A1 * | 3/2002 | George | B32B 5/12 428/105 |
| 2010/0140834 A1 | 6/2010 | Sherwood et al. | |

OTHER PUBLICATIONS

Canadian Intellectual Property Office (CIPO) Examination Search Report, issued Jan. 13, 2016, for counterpart Canadian patent application No. 2,857,783, Applicant The Boeing Company, 2 pages.

\* cited by examiner

LAMINATED COMPOSITE RADIUS FILLER WITH GEOMETRIC SHAPED FILLER ELEMENT AND METHOD OF FORMING THE SAME

BACKGROUND

1) Field of the Disclosure

The disclosure relates generally to composite structures and methods, and more specifically, to laminated composite radius fillers for composite structures, such as structures for aircraft, and methods of forming the same.

2) Description of Related Art

Composite structures, such as structures made of carbon fiber-reinforced plastic (CFRP) materials, may be used in a wide variety of applications, including in the manufacture of aircraft, spacecraft, rotorcraft, watercraft, automobiles, trucks, and other vehicles and structures, due to their high strength-to-weight ratios, corrosion resistance and other favorable properties. In particular, in aircraft construction, composite structures may be used to form the tail sections, wings, fuselage and other components.

When composite structural members are joined together, such as reinforcing stiffeners or stringers joined to composite skin panels, gaps or voids regions, typically referred to as "radius filler regions" or "noodle regions", may be present along bond lines between the composite structural members. Radius filler elements or "noodles" made of composite material or adhesive/epoxy material and having a generally triangular cross-section may be used to fill the radius filler regions or noodle regions in order to provide additional structural reinforcement to such regions.

The radius filler element or noodle used to fill the radius filler region or noodle region may be in the form of a laminated composite radius filler. Such known laminated composite radius fillers may be made of laminates formed of stacked composite plies. However, during manufacturing cure and thermal cycling stages of such known laminated composite radius fillers, such as used in composite structures including reinforcing stiffeners or stringers, delamination or layer separation may occur in the laminated composite radius fillers. Generally, such delamination occurs in an upper one-third area near the tip of the laminated composite radius filler and may occur more frequently in larger laminated composite radius fillers. Such delamination is typically caused by a difference in the coefficient of thermal expansion (CTE) between the plies adjacent to the laminated composite radius filler, i.e., wrap plies, and the laminated composite radius filler.

Known solutions to address such delamination of the laminated composite radius filler exist. For example, one such known solution involves showing that the delamination of the laminated composite radius filler is not detrimental. However, such known solution may add risk since it may be difficult to show that the delamination will not grow to a detrimental size under all environmental and loading conditions throughout the life of a composite structure.

Thus, it is desirable to be able to solve the issue of delamination of laminated composite radius fillers used in composite structures, such as reinforcing stiffeners and stringers. Accordingly, there is a need in the art for improved laminated composite radius fillers and methods of forming the same that provide advantages over known elements, assemblies and methods.

SUMMARY

This need for improved laminated composite radius fillers and methods of forming the same is satisfied. As discussed in the below detailed description, embodiments of the improved laminated composite radius fillers and methods of forming the same may provide significant advantages over known elements, assemblies and methods.

In one embodiment of the disclosure, there is provided a laminated composite radius filler for a composite structure. The laminated composite radius filler comprises a stacked ply assembly. The stacked ply assembly comprises a plurality of stacks of laminate radius filler plies cut to a desired width and having a desired ply orientation.

The laminated composite radius filler further comprises a geometric shaped filler element positioned at a desired location on a first portion of the stacked ply assembly. The geometric shaped filler element deforms a second portion of the stacked ply assembly stacked over the geometric shaped filler element, such that the laminate radius filler plies of the second portion of the stacked ply assembly change direction and have a component of direction comprising a horizontal direction and a vertical direction. The laminated composite radius filler has a shape substantially corresponding to a radius filler region of the composite structure.

In another embodiment of the disclosure, there is provided an aircraft composite assembly. The aircraft composite assembly comprises a composite structure. The composite structure comprises a radius filler region and a plurality of wrap plies adjacent the radius filler region.

The aircraft composite assembly further comprises a laminated composite radius filler having a shape substantially corresponding to the radius filler region and filling the radius filler region. The laminated composite radius filler comprises a stacked ply assembly. The stacked ply assembly comprises a plurality of stacks of laminate radius filler plies cut to a desired width and having a desired ply orientation.

The laminated composite radius filler further comprises a geometric shaped filler element positioned at a desired location on a first portion of the stacked ply assembly. The geometric shaped filler element deforms a second portion of the stacked ply assembly stacked over the geometric shaped filler element, such that the laminate radius filler plies of the second portion of the stacked ply assembly change direction and have a component of direction comprising a horizontal direction and a vertical direction.

In another embodiment of the disclosure, there is provided a method of forming a laminated composite radius filler for a composite structure. The method comprises the step of assembling a plurality of stacks of laminate radius filler plies cut to a desired width and having a desired ply orientation to form a stacked ply assembly. The method further comprises the step of laying up a first portion of the stacked ply assembly on a forming apparatus. The method further comprises the step of positioning a geometric shaped filler element at a desired location on the first portion of the stacked ply assembly.

The method further comprises the step of laying up a second portion of the stacked ply assembly over the geometric shaped filler element and the first portion to form a laminated composite radius filler. The geometric shaped filler element deforms the second portion, such that the laminate radius filler plies of the second portion change direction and have a component of direction comprising a horizontal direction and a vertical direction. The method further comprises the step of assembling the laminated composite radius filler in a radius filler region of a composite structure.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein.

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and will fully convey the scope of the disclosure to those skilled in the art.

Figure 1:
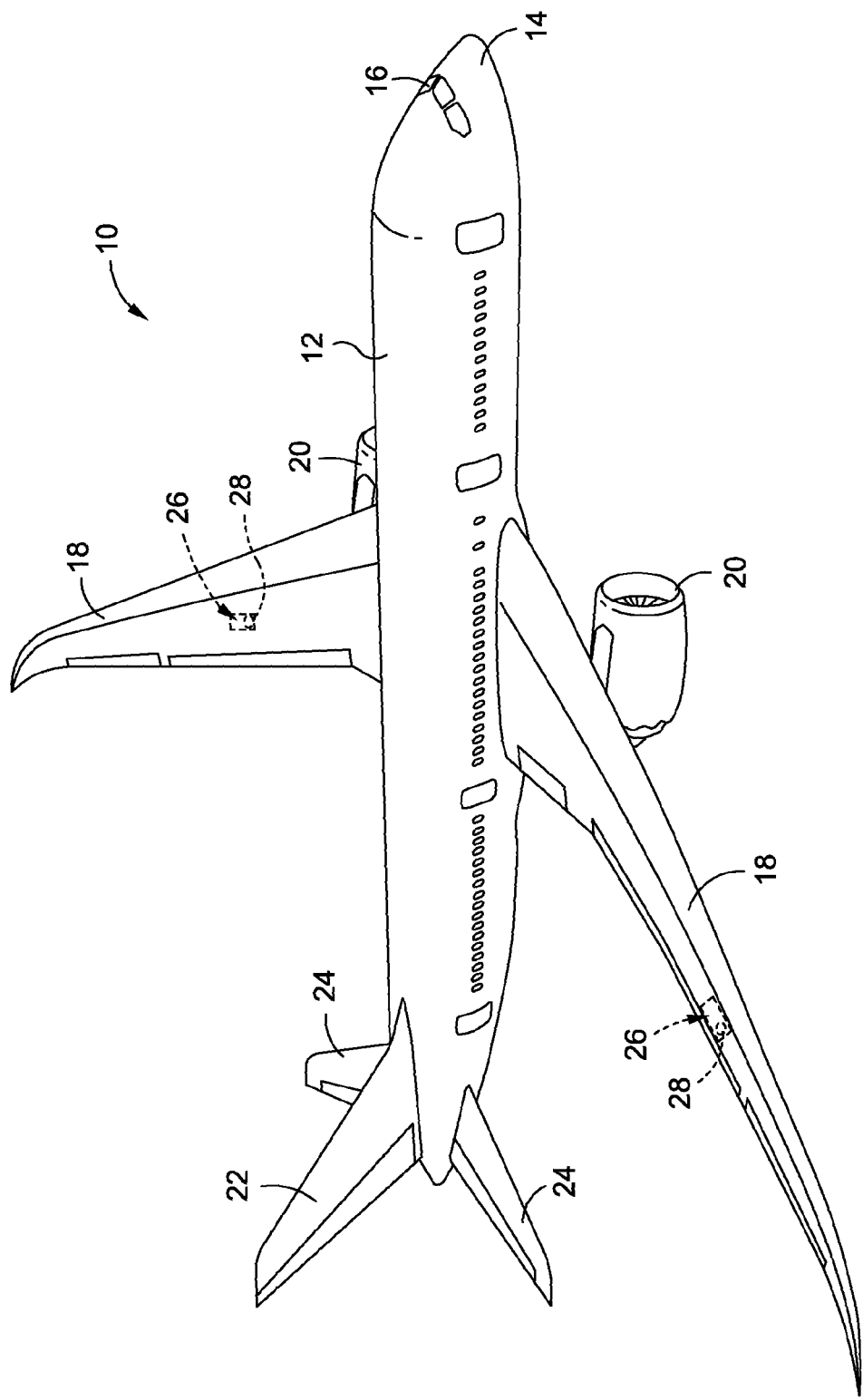
FIG. 1 is an illustration of a perspective view of an aircraft that may incorporate one or more composite assemblies having one or more composite structures with an embodiment of a laminated composite radius filler of the disclosure.

Now referring to the Figures, FIG. 1 is an illustration of a perspective view of an aircraft 10 that may incorporate one or more composite assemblies 26 with one or more composite structures 28. The composite structure 28 (see FIG. 1) may incorporate an embodiment of a laminated composite radius filler 70 (see FIGS. 3, 4A-4B, 5-7), such as, for example, a laminated composite radius filler 70a (see FIG. 5), a laminated composite radius filler 70b (see FIG. 6), or a laminated composite radius filler 70c (see FIG. 7), formed by one or more embodiments of a method 150 (see FIG. 8) of the disclosure.

As shown in FIG. 1, the aircraft 10 comprises a fuselage 12, a nose 14, a cockpit 16, wings 18, one or more propulsion units 20, a vertical tail portion 22, and horizontal tail portions 24. The aircraft 10 shown in FIG. 1 is generally representative of a commercial passenger aircraft having one or more composite assemblies 26 with one or more composite structures 28. However, the teachings of the disclosed embodiments may be applied to other passenger aircraft, cargo aircraft, military aircraft, rotorcraft, and other types of aircraft or aerial vehicles, as well as aerospace vehicles, satellites, space launch vehicles, rockets, and other aerospace vehicles, as well as boats and other watercraft, trains, automobiles, trucks, buses, or other suitable structures having one or more composite assemblies 26 with one or more composite structures 28 that may incorporate an embodiment of the laminated composite radius filler 70 (see FIGS. 3, 4A-4B, 5-7) made with one or more embodiments of the method 150 (see FIG. 8) of the disclosure.

Figure 2A:
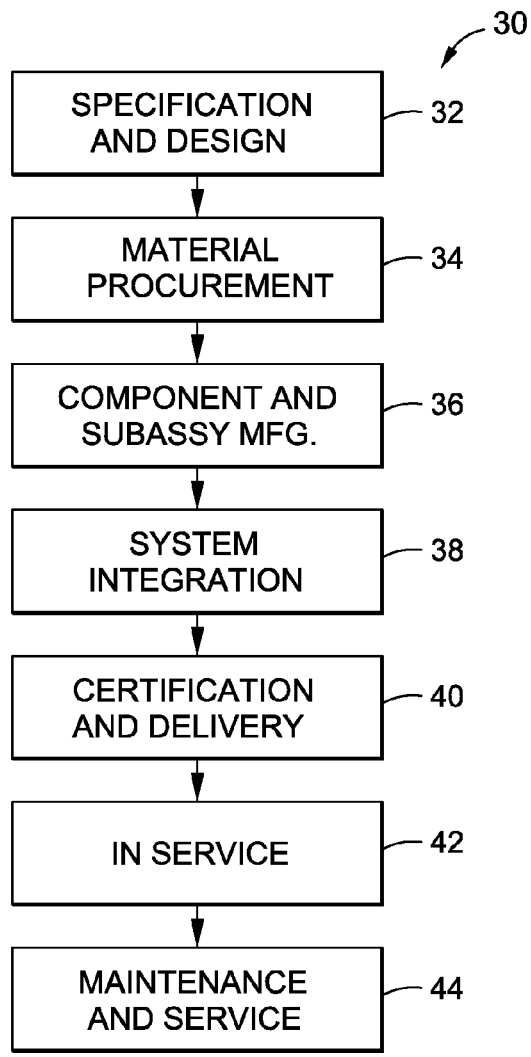
FIG. 2A is an illustration of a flow diagram of an aircraft production and service method.
Figure 2B:
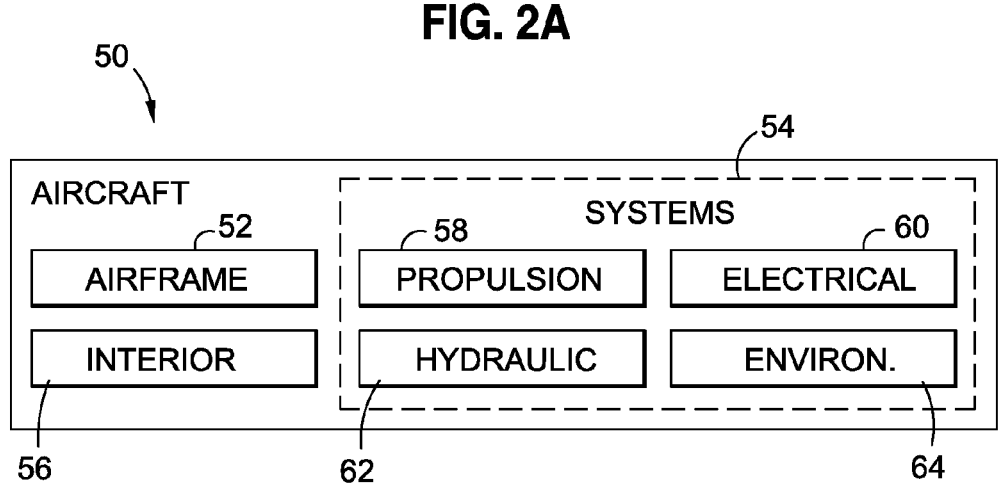
FIG. 2B is an illustration of a block diagram of an aircraft.

FIG. 2A is an illustration of a flow diagram of an aircraft production and service method 30. FIG. 2B is an illustration of a block diagram of an aircraft 50. Referring to FIGS. 2A-2B, embodiments of the disclosure may be described in the context of the aircraft production and service method 30, as shown in FIG. 2A, and the aircraft 50, as shown in FIG. 2B. During pre-production, exemplary aircraft production and service method 30 may include specification and design 32 of the aircraft 50 and material procurement 34. During production, component and subassembly manufacturing 36 and system integration 38 of the aircraft 50 takes place. Thereafter, the aircraft 50 may go through certification and delivery 40 in order to be placed in service 42. While in service 42 by a customer, the aircraft 50 may be scheduled for routine maintenance and service 44 which may also include modification, reconfiguration, refurbishment, and other suitable services.

Each of the processes of the aircraft production and service method 30 may be performed or carried out by a system integrator, a third party and/or an operator (e.g., a customer). For the purposes of this description, a system integrator may include without limitation any number of aircraft manufacturers and major-system subcontractors; a third party may include without limitation any number of vendors, subcontractors and suppliers; and, an operator may be an airline, leasing company, military entity, service organization and other suitable operators.

As shown in FIG. 2B, the aircraft 50 produced by exemplary aircraft production and service method 30 may include an airframe 52 with a plurality of high-level systems 54 and an interior 56. Examples of the plurality of high-level systems 54 may include one or more of a propulsion system 58, an electrical system 60, a hydraulic system 62, and an environmental system 64. Any number of other systems may also be included. Although an aerospace example is shown, the principles of the invention may be applied to other industries, such as the automotive industry.

Methods and systems embodied herein may be employed during any one or more of the stages of the production and service method 30. For example, components or subassemblies corresponding to component and subassembly manufacturing 36 may be fabricated or manufactured in a manner similar to components or subassemblies produced while the aircraft 50 is in service 42. Also, one or more apparatus embodiments, method embodiments, or a combination thereof, may be utilized during component and subassembly manufacturing 36 and system integration 38, for example, by substantially expediting assembly of or reducing the cost of the aircraft 50. Similarly, one or more of apparatus embodiments, method embodiments, or a combination thereof, may be utilized while the aircraft 50 is in service 42, for example and without limitation, to routine maintenance and service 44.

Figure 3:
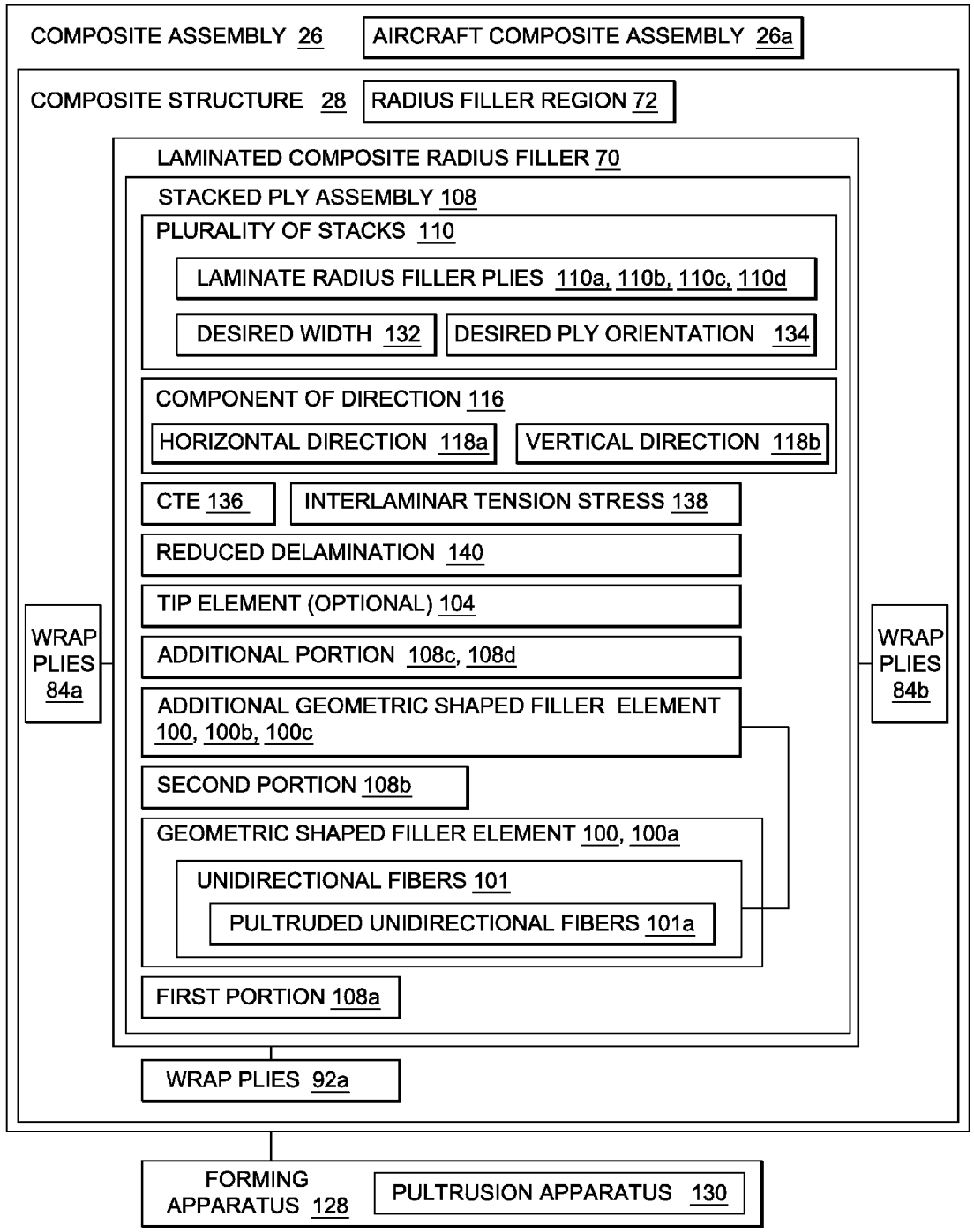
FIG. 3 is an illustration of a block diagram of a composite assembly showing an embodiment of a laminated composite radius filler of the disclosure.
Figure 4:
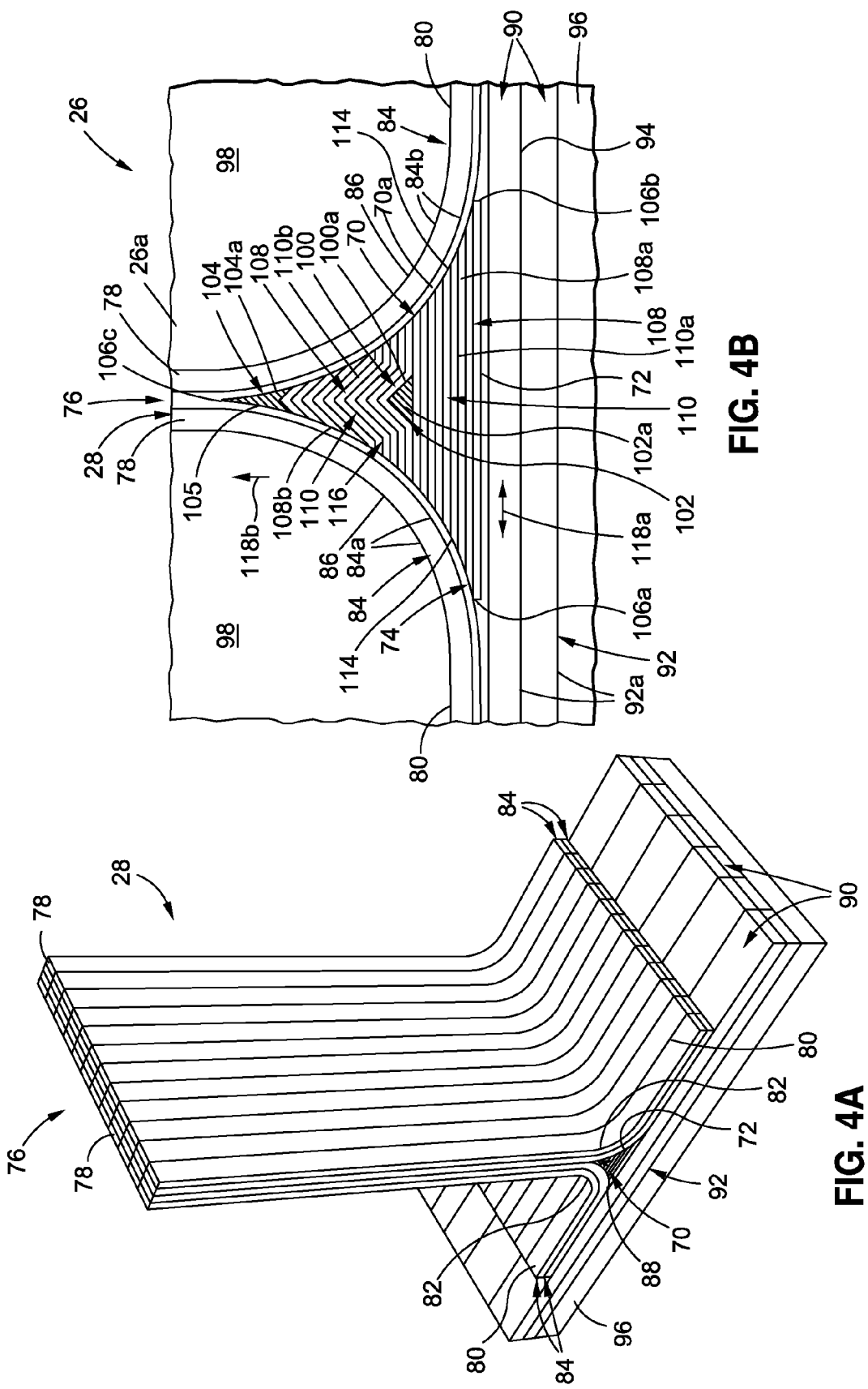
FIG. 4A is an illustration of a perspective view of a composite structure in the form of a T-stiffener having a radius filler region filled with an embodiment of a laminated composite radius filler of the disclosure.
FIG. 4B is an illustration of an enlarged, fragmentary, front sectional view of the laminated composite radius filler of FIG. 4A in a composite assembly.

In an embodiment of the disclosure, there is provided a laminated composite radius filler 70 (see FIGS. 3, 4A-4B, 5-7), i.e., "noodle", for filling a radius filler region 72 (see FIGS. 3, 4A-4B), i.e., "noodle region", for a composite structure 28 (see FIGS. 3, 4A-4B) in a composite assembly 26 (see FIGS. 3, 4B). FIG. 3 is an illustration of a block diagram of a composite assembly 26, such as an aircraft composite assembly 26a, showing an embodiment of a laminated composite radius filler 70 of the disclosure.

As shown in FIG. 3, the composite assembly 26 comprises a composite structure 28 having a radius filler region 72. As further shown in FIG. 3, the composite structure 28 comprises a laminated composite radius filler 70 that is adjacent wrap plies 84a, wrap plies 84b and wrap plies 92a of the composite structure 28.

FIG. 4A is an illustration of a perspective view of a composite structure 28, such as in the form of a T-stiffener 76, having a radius filler region 72 filled with an embodiment of a laminated composite radius filler 70 of the disclosure. FIG. 4B is an illustration of an enlarged, fragmentary, front sectional view of the laminated composite radius filler 70 of FIG. 4A in a composite assembly 26, such as an aircraft composite assembly 26a. As shown in FIG. 4B, the laminated composite radius filler 70, such as in the form of laminated composite radius filler 70a, preferably has a configuration 74 substantially corresponding to the size and shape of the radius filler region 72 of the composite structure 28.

As shown in FIG. 4A, the composite structure 28, such as in the form of T-stiffener 76 comprises vertical webs 78, horizontal flanges 80, and flange-web transitions 82 radially surrounding the laminated composite radius filler 70. The vertical webs 78 (see FIGS. 4A-4B) and the horizontal flanges 80 (see FIGS. 4A-4B) preferably comprise stacked composite plies 84 (see FIGS. 4A-4B), such as wrap plies 84a, 84b (see FIGS. 3, 4B), adjacent to the laminated composite radius filler 70 (see FIGS. 3, 4A-4B). The wrap plies 84a, 84b (see FIG. 4B) preferably have a radial orientation 86 (see FIG. 4B) extending in a vertical direction 118b (see FIG. 4B) or substantially vertical direction. As further shown in FIG. 4A, the horizontal flanges 80 of the T-stiffener 76 may be joined at an interface 88 to one or more base laminates 90 and/or skin panels 96, for example, a skin-stiffener interface.

As shown in FIG. 4B, the one or more base laminates 90 may comprise stacked composite base plies 92, such as in the form of wrap plies 92a, adjacent to the laminated composite radius filler 70. The wrap plies 92a (see FIGS. 3, 4B) preferably have a radial orientation 94 (see FIGS. 4B, 5-7) extending in a horizontal direction 118a (see FIG. 4B). As further shown in FIG. 4B, the composite assembly 26, such as in the form of aircraft composite assembly 26a, shows the laminated composite radius filler 70 surrounded by spars 98.

As shown in FIGS. 3, 4B the laminated composite radius filler 70 comprises a geometric shaped filler element 100 having a geometric shape 102 (see FIG. 4B), an optional tip element 104, base portions 106a, 106b (see FIG. 4B), top portion 106c (see FIG. 4B), and a stacked ply assembly 108. The laminated composite radius filler 70 (see FIGS. 3, 4B, 5-7) may incorporate one or more geometric shaped filler elements 100 (see FIGS. 3, 4B, 5-7) positioned within the stacked ply assembly 108 (see FIGS. 3, 4B, 5-7) of the laminated composite radius filler 70 (see FIGS. 3, 4B, 5-7).

The laminated composite radius filler 70 (see FIGS. 3, 4B, 5-7) may be formed of a composite material by any suitable means including, but not limited to, pultrusion, extrusion, hand lay up, automated lay up, or any other suitable forming process, as described in greater detail below. The laminated composite radius filler 70 (see FIGS. 3, 4B, 5-7) may be formed by first forming the stacked ply assembly 108 (see FIGS. 3, 4B, 5-7). As shown in FIG. 3, the stacked ply assembly 108 preferably comprises a plurality of stacks 110 (see also FIGS. 4B, 5-7) of laminate radius filler plies 110a (see also FIG. 4B), 110b (see also FIG. 4B), 110c (see also FIG. 6), and/or 110d (see also FIG. 7) cut to a desired width 132 and having a desired ply orientation 134.

The desired width 132 (see FIG. 3) may be chosen from large to small widths and may be chosen to conform to the size and shape of a radius 114 (see FIG. 4B) of the laminated composite radius filler 70 (see FIG. 4B) that is finally formed. The desired ply orientation 134 (see FIG. 3) may be tailored to any ply direction desired. For example, the desired ply orientation 134 may include without limitation, such ply orientations as +45 degree/−45 degree, +50 degree/−50 degree, 0 degree, 90 degree, or another suitable ply orientation. By way of example, as used herein, "+45 degree" means that a ply is rotated 45 degrees clockwise and "−45 degree" means a ply is rotated 45 degrees counterclockwise. Choosing the desired ply orientation 134 (see FIG. 3) for the stacked ply assembly 108 (see FIGS. 3, 4B) depends on the desired stiffness of the laminated composite radius filler 70 (see FIGS. 3, 4B) relative to the stiffness of the surrounding wrap plies 84a, 84b, 92a (see FIGS. 3, 4B).

As shown in FIGS. 3, 4B, the stacked ply assembly 108 preferably comprises a first portion 108a and a second portion 108b. Where more than one geometric shaped filler elements 100 (see FIGS. 6, 7) are formed in the laminated composite radius filler 70 (see FIGS. 6, 7), one or more of additional portion 108c (see FIG. 6), additional portion 108d (see FIG. 7), or other additional portions, may be formed from the second portion 108b (see FIGS. 5-7).

The stacked ply assembly 108 (see FIGS. 3, 4B) of the laminated composite radius filler 70 (see FIGS. 3, 4B) may be made of the same or similar resin and fiber material used to form components of the composite assembly 26 (see FIGS. 3, 4B), such as the composite structure 28 (see FIGS. 3, 4B), the spars 98 (see FIG. 4B), the base laminates 90 (see FIG. 4B) and the skin panel 96 (see FIG. 4B). For example, the stacked composite plies 84, stacked composite base plies 92, and the plurality of stacks 110 (see FIG. 3) of laminate radius filler plies 110a (see FIG. 4B), 110b (see FIG. 4B), 110c (see FIG. 6), and/or 110d (see FIG. 7) may be formed from a reinforcement material surrounded by and supported within a matrix material, such as for example, a prepreg material.

The reinforcement material may comprise high-strength fibers, such as glass or carbon fibers, graphite, aromatic polyamide fiber, fiberglass, or another suitable reinforcement material. The matrix material may comprise various polymer or resin materials, such as epoxy, polyester, vinyl ester resins, polyetheretherketone polymer (PEEK), polyetherketoneketone polymer (PEKK), bismaleimide, or another suitable matrix material. As used herein, "prepreg" means a woven or braided fabric or cloth-like tape material, e.g., fiberglass or carbon fibers, that have been impregnated with an uncured or partially cured resin, which is flexible enough to be formed into a desired shape, then "cured," e.g., by the application of heat in an oven or an autoclave or other heating means, to harden the resin into a strong, rigid, fiber-reinforced structure.

The stacked composite plies 84, the stacked composite base plies 92, and the plurality of stacks 110 (see FIG. 3) of laminate radius filler plies 110a (see FIG. 4B), 110b (see FIG. 4B), 110c (see FIG. 6), and/or 110d (see FIG. 7) may be in the form of a prepreg unidirectional tape, a unidirectional fiber tape, a carbon fiber-reinforced plastic (CFRP) tape, or another suitable tape; a carbon fiber-reinforced plastic (CFRP) fabric, a prepreg fabric, a woven fabric including a woven carbon fiber fabric, or another suitable fabric; a combination of a tape or a fabric thereof; or another suitable composite material.

As discussed in further detail below with respect to the method 150, the first portion 108*a* (see FIG. 3) of the stacked ply assembly 108 (see FIG. 3) may comprise three or four plies with preferably at least one ply having a zero degree (0°) ply orientation. If an automated lay up process is used to form the stacked ply assembly 108 (see FIG. 3), the plurality of stacks 110 comprising the laminate radius filler plies 110*a* (see FIG. 4B), 110*b* (see FIG. 4B), 110*c* (see FIG. 6), and/or 110*d* (see FIG. 7) may be laid up with single plies in any desired ply orientation 134 (see FIG. 3).

As further shown in FIGS. 3, 4B, 5-6 the laminated composite radius filler 70 may optionally comprise a tip element 104. The tip element 104 (see FIGS. 3, 4B, 5-6) is preferably comprised of a plurality of unidirectional fibers, a unidirectional fiber tape, a prepreg unidirectional tape, a unidirectional composite tow, a slit unidirectional tape, a carbon fiber-reinforced plastic (CFRP) tape, a carbon fiber-reinforced plastic (CFRP) fabric, a prepreg fabric, a woven fabric including a woven carbon fiber fabric, chopped fiber, a combination thereof, or another suitable fiber material.

Figure 5:
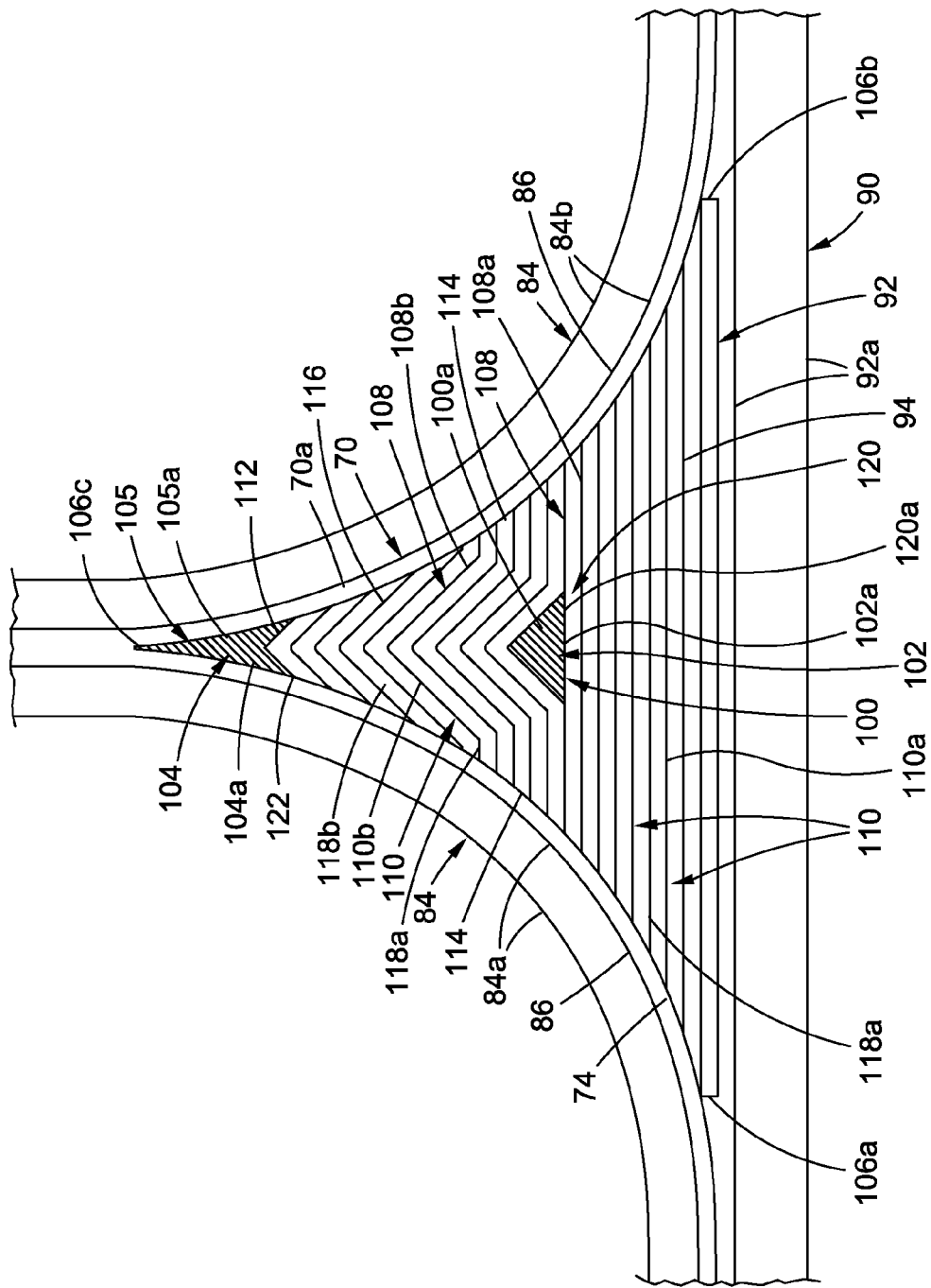
FIG. 5 is an illustration of an enlarged, front sectional view of one of the embodiments of a laminated composite radius filler of the disclosure having one geometric shaped filler element and a tip element.

The tip element 104 (see FIGS. 3, 4B, 5-6) preferably has a configuration 105 (see FIGS. 4B, 5-6) comprising one of a substantially arrowhead configuration 105*a* (see FIG. 5), a multi-triangle configuration 105*b* (see FIG. 6), or another suitable configuration. As shown in FIG. 5, the tip element 104, such as in the form of tip element 104*a*, is positioned on a top portion 122 of the stacked ply assembly 108, such as the top portion 122 of the second portion 108*b* of the stacked ply assembly 108. As further shown in FIG. 5, the tip element 104*a* has a configuration 105 in the form of a substantially arrowhead configuration 105*a*.

Figure 6:
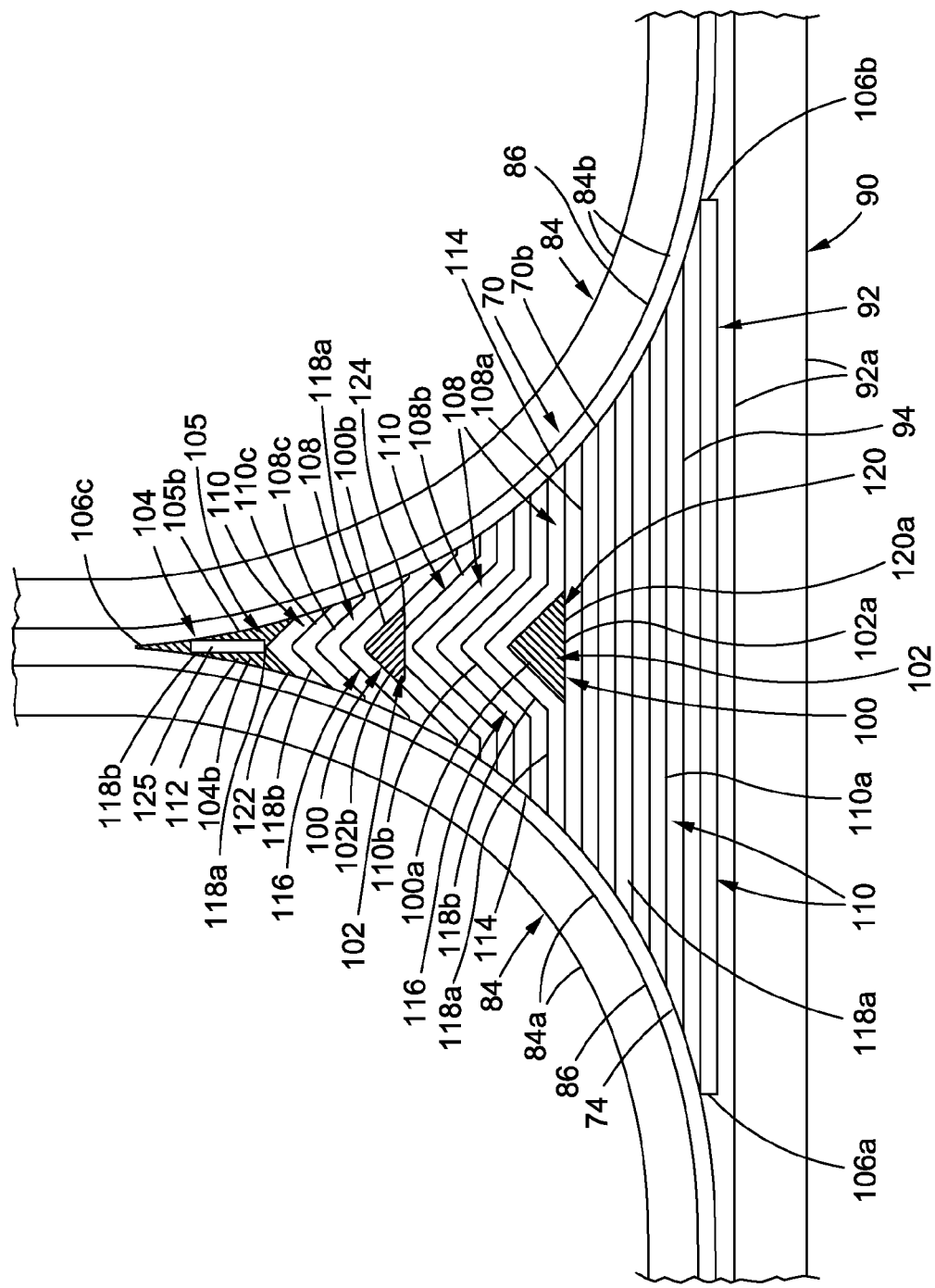
FIG. 6 is an illustration of an enlarged, front sectional view of another one of the embodiments of a laminated composite radius filler of the disclosure having two geometric shaped filler elements and a tip element.

As shown in FIG. 6, the tip element 104, such as in the form of tip element 104*b*, is positioned on a top portion 122 of the stacked ply assembly 108, such as the top portion 122 of the additional portion 108*c* of the stacked ply assembly 108. As further shown in FIG. 6, the tip element 104*b* has a configuration 105 in the form of a multi-triangle configuration 105*b*.

As further shown in FIGS. 3, 4B, 5-7, the laminated composite radius filler 70 comprises the geometric shaped filler element 100, such as in the form of a first geometric shaped filler element 100*a*, positioned at a desired location 120 (see FIGS. 5-7) on a first portion 108*a* (see FIGS. 5-7) of the stacked ply assembly 108. As shown in FIG. 5, in one embodiment, the desired location 120 on the first portion 108*a* of the stacked ply assembly 108 is preferably a central location 120*a* or substantially central location, on the first portion 108*a*. However, other suitable desired locations may also be chosen. Since delamination or crack formation in laminated composite radius fillers may typically start in the upper portion, such as the upper one-half portion or upper one-third portion, of the laminated composite radius filler, preferably, the one or more geometric shaped filler elements 100 (see FIGS. 4B, 5-7) are positioned or located in the upper portion, such as the upper one-half portion or the upper one-third portion, of the laminated composite radius filler 70 (see FIGS. 4B, 5-7).

In addition, preferably the second portion 108*b* (see FIGS. 4B, 5-7) of the stacked ply assembly 108 (see FIGS. 4B, 5-7) in the upper portion, such as the upper one-half portion or the upper one-third portion, of the laminated composite radius filler 70 (see FIGS. 4B, 5-7), is deformed or shaped by the one or more geometric shaped filler elements 100 (see FIGS. 4B, 5-7). The one or more geometric shaped filler elements 100 (see FIGS. 4B, 5-7) preferably deform or bend the second portion 108*b* (see FIGS. 4B, 5-7), and any additional portions 108*c* (see FIG. 6), 108*d* (see FIG. 7), of the stacked ply assembly 108 (see FIGS. 4B, 5-7) that are stacked over the respective geometric shaped filler elements 100 (see FIGS. 4B, 5-7). This deformation causes the laminate radius filler plies 110*b* (see FIGS. 4B, 4-7), 110*c* (see FIG. 6), and/or 110*d* (see FIG. 7) of the second portion 108*b* (see FIGS. 4B, 5-7), and any additional portions 108*c* (see FIG. 6), 108*d* (see FIG. 7), of the stacked ply assembly 108 (see FIGS. 4B, 5), to bend and change direction and have a component of direction 116 (see FIGS. 3, 4B, 5-7) comprising a horizontal direction 118*a* (see FIGS. 3, 4B, 5-7) and a vertical direction 118*b* (see FIGS. 3, 4B, 5-7), so as to substantially match the vertical direction 118*b* (see FIG. 4B) of the wrap plies 84*a*, 84*b* (see FIG. 4B) adjacent the laminated composite radius filler 70 (see FIGS. 3, 4B, 5-7). As used herein, "horizontal direction" means a direction horizontal or substantially horizontal, and parallel or substantially parallel to a ground level, and perpendicular or substantially perpendicular to a vertical direction. As used herein, "vertical direction" means a direction vertical or substantially vertical, and normal or perpendicular or substantially normal or substantially perpendicular, to a horizontal direction.

Figure 7:
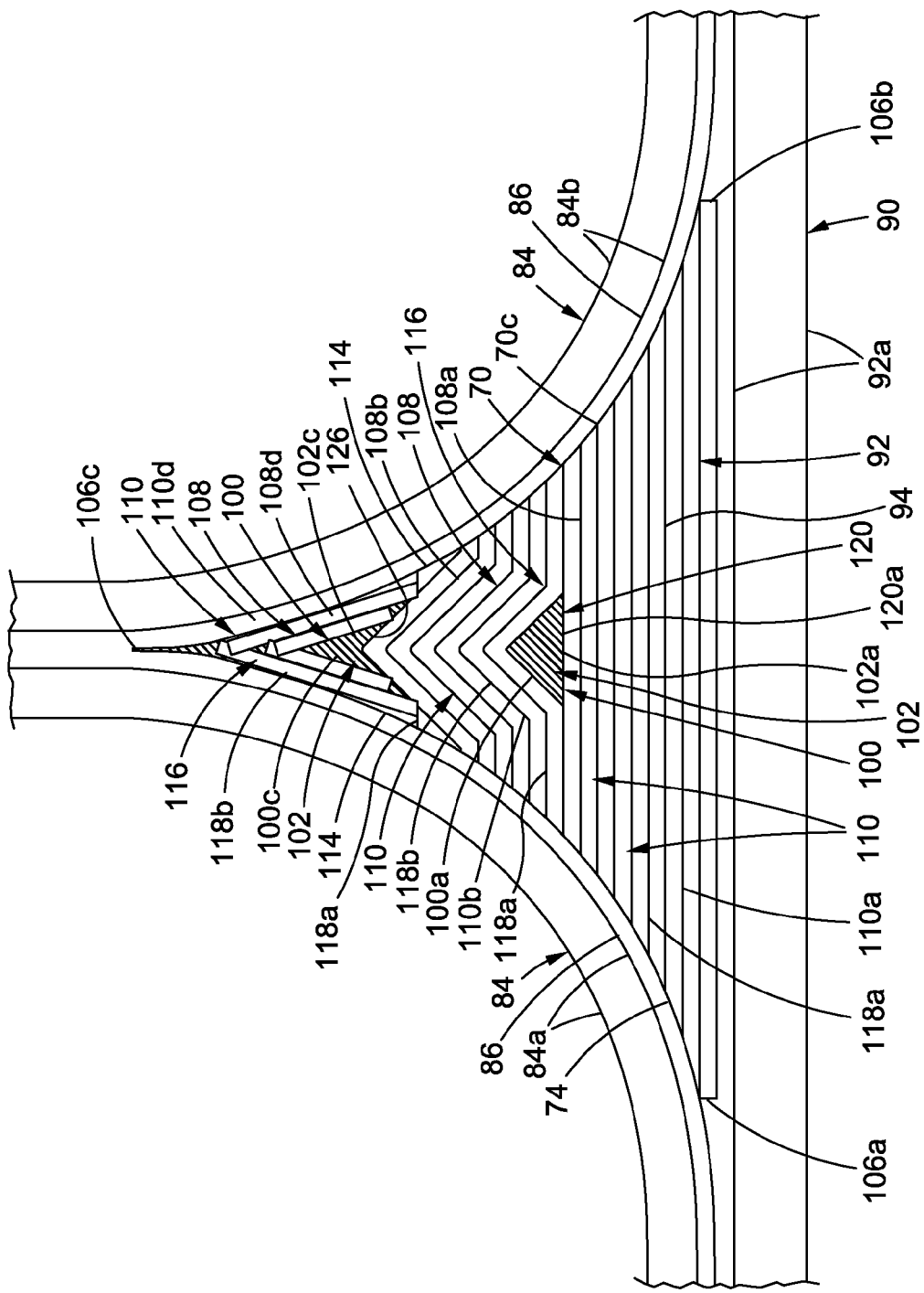
FIG. 7 is an illustration of an enlarged, front sectional view of another one of the embodiments of a laminated composite radius filler of the disclosure having two geometric shaped filler elements and no tip element; and, FIG. 8 is an illustration of a flow diagram of an exemplary embodiment of the method of the disclosure.

As shown in FIG. 3, the laminated composite radius filler 70 may further comprise one or more additional geometric shaped filler elements 100, such as additional geometric shaped filler element 100*b* (see also FIG. 6), or additional geometric shaped filler element 100*c* (see also FIG. 7), or another suitable additional geometric shaped filler element 100. As shown in FIG. 6, the additional geometric shaped filler element 100*b* is preferably positioned at a desired location 124 on the second portion 108*b* and in and below the additional portion 108*c*. Further, as shown in FIG. 7, the additional geometric shaped filler element 100*c* is preferably positioned at a desired location 126 on the second portion 108*b* and in and below the additional portion 108*d*.

The geometric shaped filler element 100, 100*a* (see FIG. 3) and any additional geometric shaped filler elements 100, 100*b*, 100*c* (see FIG. 3) are each preferably comprised of a plurality of unidirectional fibers 101 (see FIG. 3), a unidirectional fiber tape, a prepreg unidirectional tape, a unidirectional composite tow, a slit unidirectional tape, a carbon fiber-reinforced plastic (CFRP) tape, a carbon fiber-reinforced plastic (CFRP) fabric, a prepreg fabric, a woven fabric including a woven carbon fiber fabric, chopped fiber, a combination thereof, or another suitable fiber material. The unidirectional fibers 101 (see FIG. 3) preferably substantially run down a length of the composite structure 28 (see FIG. 4A).

In one embodiment the geometric shaped filler element 100, 100*a* (see FIG. 3) and any additional geometric shaped filler elements 100, 100*b*, 100*c* (see FIG. 3) may be comprised of pultruded unidirectional fibers 101*a* (see FIG. 3) having a zero degree (0°) ply orientation. Preferably, the pultruded unidirectional fibers 101*a* (see FIG. 3) are formed using a pultrusion process and a pultrusion apparatus 130 (see FIG. 3), as discussed in further detail below.

The geometric shaped filler element 100, 100*a* (see FIG. 3) and any additional geometric shaped filler elements 100, 100*b*, 100*c* (see FIG. 3) preferably each have a geometric shape 102 (see FIGS. 4B, 5-7). The geometric shape 102 (see FIGS. 4B, 5-7) may comprise one of a triangle shape 102*a* (see FIGS. 4B, 5), a triangle with curved corners shape 102*b* (see FIG. 6), an arrowhead shape 102*c* (see FIG. 7), a triangle with corners removed shape (not shown), a triangle with one or more curved sides shape (not shown), a radius filler shape (not shown), a half circle shape (not shown), or another suitable geometric shape.

The purpose of the geometric shaped filler element 100, 100*a* (see FIG. 3) and any additional geometric shaped filler elements 100, 100b, 100c (see FIG. 3), as discussed above, is to change the respective direction of the laminate radius filler plies 110b (see FIG. 4B), 100c (see FIG. 6), and/or 110d (see FIG. 7) of the second portion 108b (see FIG. 3) and any additional portions 108c, 108d (see FIG. 3) to bend and change direction and have a component of direction 116 comprising the horizontal direction 118a (see FIGS. 3, 4B, 5-7) and the vertical direction 118b (see FIGS. 3, 4B, 5-7).

Various embodiments of the laminated composite radius filler 70 are shown in FIGS. 5-7. Such embodiments are not meant to be limiting.

FIG. 5 is an illustration of an enlarged, front sectional view of one of the embodiments of the laminated composite radius filler 70, such as in the form of laminated composite radius filler 70a, of the disclosure. The laminated composite radius filler 70a shown in FIG. 5 has one geometric shaped filler element 100, such as in the form of first geometric shaped filler element 100a. The first geometric shaped filler element 100a (see FIG. 5) preferably has a geometric shape 102 (see FIG. 5) in the form of a triangle shape 102a (see FIG. 5). However, the geometric shaped filler element 100, such as in the form of first geometric shaped filler element 100a, may have another suitable geometric shape.

FIG. 5 shows the base portions 106a, 106b and the top portion 106c of the laminated composite radius filler 70, such as in the form of laminated composite radius filler 70a. FIG. 5 further shows the stacked composite plies 84, such as in the form of wrap plies 84a, 84b, and the stacked composite base plies 92 of the base laminate 90, such as in the form of wrap plies 92a. The wrap plies 84a, 84ba and the wrap plies 92a surround the laminated composite radius filler 70, such as in the form of laminated composite radius filler 70a.

The laminated composite radius filler 70 (see FIG. 5), such as in the form of laminated composite radius filler 70a (see FIG. 5), preferably has a configuration 74 (see FIG. 5) substantially corresponding to the shape and size of the radius filler region 72 (see FIG. 4B) of the composite structure 28 (see FIG. 4B). As shown in FIG. 5, the configuration 74 of the laminated composite radius filler 70 is a substantially triangle shape. However, the laminated composite radius filler 70 (see FIG. 5) may have another suitable shape or configuration.

The laminated composite radius filler 70a shown in FIG. 5 further has a tip element 104, such as in the form of tip element 104a. The tip element 104a (see FIG. 5) has a configuration 105 (see FIG. 5) in the form of a substantially arrowhead configuration 105a (see FIG. 5). As further shown in FIG. 5, the tip element 104a is preferably positioned at a tip location 112 of the laminated composite radius filler 70, such as laminated composite radius filler 70a. As further shown in FIG. 5, the tip element 104a is preferably positioned on a top portion 122 of the stacked ply assembly 108, such as the top portion 122 of the second portion 108b of the stacked ply assembly 108.

FIG. 5 shows the geometric shaped filler element 100, such as in the form of first geometric shaped filler element 100a, positioned at the desired location 120, such as a central location 120a or substantially central location, on the first portion 108a of the stacked ply assembly 108. However, the geometric shaped filler element 100 (see FIG. 5), such as in the form of first geometric shaped filler element 100a (see FIG. 5), may be positioned at another suitable desired location 120 (see FIG. 5) on the first portion 108a (see FIG. 5).

As shown in FIG. 5, the geometric shaped filler element 100, such as in the form first geometric shaped filler element 100a, preferably deforms the second portion 108b of the stacked ply assembly 108 stacked over the first geometric shaped filler element 100a. This causes the plurality of stacks 110 (see FIG. 5) of laminate radius filler plies 110b (see FIG. 5) of the second portion 108b (see FIG. 5) to change direction. As further shown in FIG. 5, the laminate radius filler plies 110a preferably each have a component of direction 116 comprising a horizontal direction 118a and a vertical direction 118b. Preferably, changing the direction of the laminate radius filler plies 110b (see FIG. 5) of the second portion 108b (see FIG. 5) minimizes a difference in coefficient of thermal expansion (CTE) 136 (see FIG. 3) and interlaminar tension stress 138 (see FIG. 3) between the laminated composite radius filler 70 (see FIG. 5) and the wrap plies 84a, 84b (see FIG. 5) adjacent the laminated composite radius filler 70 (see FIG. 5).

As used herein, "coefficient of thermal expansion (CTE)" means a measure of the change in size or volume of a material in response to a change in the material's temperature. As used herein, "interlaminar tension stress" means the stress normal to a plurality of plies, for example, tape or fabric plies, that tends to pull the plies apart or delaminate them. Minimizing the difference in CTE 136 (see FIG. 3) and interlaminar tension stress 138 (see FIG. 3) preferably eliminates delamination or results in a reduced delamination 140 (see FIG. 3) of the laminated composite radius filler 70 (see FIG. 5). Such delamination may result from thermal stresses that occur during the cure and thermal cycling stages of manufacture of the composite structure 28 (see FIG. 4B) and/or the composite assembly 26 (see FIG. 4B).

Thus, instead of being stacked in a horizontal direction 118a (see FIG. 4B) throughout the laminated composite radius filler 70, the laminate radius filler plies 110b (see FIG. 5) stacked over the geometric shaped filler element 100 (see FIG. 5) start deforming or bending to have a component of direction 116 (see FIG. 5) comprising the horizontal direction 118a (see FIG. 5) and the vertical direction 118b (see FIG. 5) to match or substantially match or follow the vertical direction 118b (see FIG. 4B) of the wrap plies 84a, 84b (see FIGS. 4B, 5) adjacent the laminated composite radius filler 70 (see FIG. 5).

This preferably minimizes the difference in the CTE 136 (see FIG. 3) between the laminated composite radius filler 70 (see FIG. 5) and the wrap plies 84a, 84b (see FIG. 5) adjacent the laminated composite radius filler 70 (see FIG. 5). This is because the laminate radius filler plies 110b (see FIG. 5) of the laminated composite radius filler 70 (see FIG. 5) and the wrap plies 84a, 84b (see FIG. 5) have the same or similar vertical orientation. In addition, for the laminate radius filler plies 110b (see FIG. 5) stacked over the geometric shaped filler element 100a (see FIG. 5), a radial orientation 114 (see FIG. 5) of the second 108b (see FIG. 5) of the laminated composite radius filler 70 (see FIG. 5) preferably substantially matches a radial orientation 86 (see FIG. 5) of the stacked composite plies 84 (see FIG. 5), such as the wrap plies 84a, 84b (see FIG. 5).

FIG. 6 is an illustration of an enlarged, front sectional view of another one of the embodiments of the laminated composite radius filler 70, such as in the form of laminated composite radius filler 70b, of the disclosure. The laminated composite radius filler 70b shown in FIG. 6 has two geometric shaped filler elements 100, such as in the form of first geometric shaped filler element 100a, and additional geometric shaped filler element 100b. The first geometric shaped filler element 100a (see FIG. 6) preferably has a geometric shape 102 (see FIG. 6) in the form of a triangle shape 102a (see FIG. 6). The additional geometric shaped filler element 100b (see FIG. 6) preferably has a geometric shape 102 (see FIG. 6) in the form of a triangle with curved corners shape 102b (see FIG. 6). However, the geometric shaped filler elements 100, such as in the forms of first geometric shaped filler element 100a and additional geometric shaped filler element 100b, may each have another suitable geometric shape.

FIG. 6 shows the base portions 106a, 106b and the top portion 106c of the laminated composite radius filler 70, such as in the form of laminated composite radius filler 70b. FIG. 6 further shows the stacked composite plies 84, such as in the form of wrap plies 84a, 84b, and the stacked composite base plies 92 of the base laminate 90, such as in the form of wrap plies 92a. As shown in FIG. 6, the wrap plies 84a, 84b and wrap plies 92a surround the laminated composite radius filler 70, such as in the form of laminated composite radius filler 70b.

The laminated composite radius filler 70 (see FIG. 6), such as in the form of laminated composite radius filler 70b (see FIG. 6), preferably has a configuration 74 (see FIG. 6) substantially corresponding to the shape and size of the radius filler region 72 (see FIG. 4B) of the composite structure 28 (see FIG. 4B). As shown in FIG. 6, the configuration 74 of the laminated composite radius filler 70 is a substantially triangle shape. However, the laminated composite radius filler 70 (see FIG. 6) may have another suitable shape or configuration.

The laminated composite radius filler 70b shown in FIG. 6 further has a tip element 104, such as in the form of tip element 104b. As shown in FIG. 6, the tip element 104b has a configuration 105 in the form of a multi-triangle configuration 105b. As further shown in FIG. 6, the tip element 104b is preferably positioned at a tip location 112 of the laminated composite radius filler 70, such as in the form of laminated composite radius filler 70b. As further shown in FIG. 6, the tip element 104b is preferably positioned on a top portion 122 of the stacked ply assembly 108, such as the top portion 122 of the additional portion 108c of the stacked ply assembly 108. The tip element 104b (see FIG. 6) may be formed via a pultrusion process or another suitable process. If a die is used, a vertical ply 125 (see FIG. 6) of fabric or tape oriented with the height in the vertical direction 118b (see FIG. 6) and the width in the horizontal direction 118a (see FIG. 6), may be used in addition to, or instead of, the tip element 104 (see FIG. 6) that is pultruded. The vertical ply 125 (see FIG. 6) would preferably be a first portion of the laminated composite radius filler 70b to be put into a die.

FIG. 6 shows the geometric shaped filler element 100, such as in the form of first geometric shaped filler element 100a, positioned at the desired location 120, such as the central location 120a or substantially central location, on the first portion 108a of the stacked ply assembly 108. However, the geometric shaped filler element 100 (see FIG. 6), such as in the form of first geometric shaped filler element 100a (see FIG. 6), may be positioned at another suitable desired location on the first portion 108a (see FIG. 6).

FIG. 6 further shows the geometric shaped filler element 100, such as in the form of additional geometric shaped filler element 100b, positioned at the desired location 124 on the second portion 108b of the stacked ply assembly 108. Preferably, the desired location 124 (see FIG. 6) is a central location or substantially central location on the second portion 108b (see FIG. 6). However, the geometric shaped filler element 100 (see FIG. 6), such as in the form of additional geometric shaped filler element 100b (see FIG. 6), may be positioned at another suitable desired location on the second portion 108b (see FIG. 6).

As shown in FIG. 6, the geometric shaped filler element 100, such as in the form of first geometric shaped filler element 100a, preferably deforms the second portion 108b of the stacked ply assembly 108 stacked over the first geometric shaped filler element 100a. This causes the plurality of stacks 110 (see FIG. 6) of laminate radius filler plies 110b (see FIG. 6) of the second portion 108b (see FIG. 6) to change direction. The laminate radius filler plies 110a (see FIG. 6) are oriented in the horizontal direction 118a (see FIG. 6) and change direction or deform to laminate radius filler plies 110b (see FIG. 6) having a component of direction 116 (see FIG. 6) comprising the horizontal direction 118a and the vertical direction 118b (see FIG. 6).

As further shown in FIG. 6, the geometric shaped filler element 100, such as in the form of additional geometric shaped filler element 100b, preferably deforms the additional portion 108c stacked over the additional geometric shaped filler element 100b. This causes the plurality of stacks 110 (see FIG. 6) of laminate radius filler plies 110c (see FIG. 6) of the additional portion 108c (see FIG. 6) to change direction. The laminate radius filler plies 110c (see FIG. 6) deform or bend to have a component of direction 116 (see FIG. 6) comprising the horizontal direction 118a (see FIG. 6) and the vertical direction 118b (see FIG. 6).

Preferably, changing the direction of the laminate radius filler plies 110b (see FIG. 6) of the second portion 108b (see FIG. 6) and changing the direction of the laminate radius filler plies 110c (see FIG. 6) of the additional portion 108c (see FIG. 6) both help to minimize a difference in CTE 136 (see FIG. 3) and interlaminar tension stress 138 (see FIG. 3) between the laminated composite radius filler 70 (see FIG. 6) and the wrap plies 84a, 84b (see FIG. 6) adjacent the laminated composite radius filler 70 (see FIG. 6). Minimizing the difference in CTE 136 (see FIG. 3) and interlaminar tension stress 138 (see FIG. 3) preferably eliminates delamination or results in a reduced delamination 140 (see FIG. 3) of the laminated composite radius filler 70 (see FIG. 5). Such delamination may result from thermal stresses that occur during the cure and thermal cycling stages of manufacture of the composite structure 28 (see FIG. 4B) and/or the composite assembly 26 (see FIG. 4B).

Thus, instead of being stacked in the horizontal direction 118a (see FIG. 4B) throughout the laminated composite radius filler 70 (see FIG. 6), the laminate radius filler plies 110b (see FIG. 6) stacked over the first geometric shaped filler element 100a (see FIG. 6) and the laminate radius filler plies 110c (see FIG. 6) stacked over the additional geometric shaped filler element 100b (see FIG. 6) both start deforming or bending to have a component of direction 116 (see FIG. 6) comprising the horizontal direction 118a and the vertical direction 118b (see FIG. 6) to match or substantially match or follow the vertical direction 118a (see FIG. 4B) of the wrap plies 84a, 84b (see FIGS. 4B, 6) adjacent the laminated composite radius filler 70 (see FIG. 6).

This preferably minimizes the difference in the CTE 136 (see FIG. 3) between the laminated composite radius filler 70 (see FIG. 6) and the wrap plies 84a, 84b (see FIG. 6) adjacent the laminated composite radius filler 70 (see FIG. 6). This is because both the laminate radius filler plies 110b (see FIG. 6) and the laminate radius filler plies 110c (see FIG. 6) of the laminated composite radius filler 70 (see FIG. 6), and the wrap plies 84a, 84b (see FIG. 6), have the same or similar vertical orientation.

In addition, for the laminate radius filler plies 110b (see FIG. 6) stacked over the geometric shaped filler element 100a (see FIG. 6), and for the laminate radius filler plies 110c (see FIG. 6) stacked over the additional geometric shaped filler element 100b (see FIG. 6), the radial orientation 114 (see FIG. 6) of the second portion 108b (see FIG. 6) and the additional portion 108c (see FIG. 6) of the laminated composite radius filler 70 (see FIG. 5) preferably substantially matches the radial orientation 86 (see FIG. 6) of the stacked composite plies 84 (see FIG. 6), such as the wrap plies 84a, 84b (see FIG. 6).

FIG. 7 is an illustration of an enlarged, front sectional view of another one of the embodiments of the laminated composite radius filler 70, such as in the form of laminated composite radius filler 70c, of the disclosure. The laminated composite radius filler 70c shown in FIG. 7 has two geometric shaped filler elements 100, such as in the forms of first geometric shaped filler element 100a, and additional geometric shaped filler element 100c.

The first geometric shaped filler element 100a (see FIG. 7) preferably has a geometric shape 102 (see FIG. 7) in the form of a triangle shape 102a (see FIG. 7). The additional geometric shaped filler element 100c (see FIG. 7) preferably has a geometric shape 102 (see FIG. 7) in the form of an arrowhead shape 102c (see FIG. 7). However, the geometric shaped filler element 100, such as in the forms of the first geometric shaped filler element 100a and the additional geometric shaped filler element 100c, may each have another suitable geometric shape.

FIG. 7 shows the base portions 106a, 106b and the top portion 106c of the laminated composite radius filler 70, such as in the form of laminated composite radius filler 70c. FIG. 7 further shows the stacked composite plies 84, such as in the form of wrap plies 84a, 84b, and the stacked composite base plies 92 of the base laminate 90, such as in the form of wrap plies 92a. As shown in FIG. 7, the wrap plies 84a, 84b and the wrap plies 92 surround the laminated composite radius filler 70, such as in the form of laminated composite radius filler 70c.

The laminated composite radius filler 70 (see FIG. 7), such as in the form of laminated composite radius filler 70c (see FIG. 7), preferably has a configuration 74 (see FIG. 7) substantially corresponding to the shape and size of the radius filler region 72 (see FIG. 4B) of the composite structure 28 (see FIG. 4B). As shown in FIG. 7, the configuration 74 of the laminated composite radius filler 70 is a substantially triangle shape. However, the laminated composite radius filler 70 (see FIG. 7) may have another suitable shape or configuration.

FIG. 7 shows the geometric shaped filler element 100, such as in the form of first geometric shaped filler element 100a, positioned at the desired location 120, such as the central location 120a or substantially central location, on the first portion 108a of the stacked ply assembly 108. However, the geometric shaped filler element 100, such as in the form of first geometric shaped filler element 100a, may be positioned at another suitable desired location on the first portion 108a (see FIG. 7).

The laminated composite radius filler 70c shown in FIG. 7 does not have a tip element 104 (see FIGS. 5-6). In place of the tip element 104 (see FIGS. 5-6), FIG. 7 shows the laminated composite radius filler 70c having the geometric shaped filler element 100, such as in the form of additional geometric shaped filler element 100c, positioned at a desired location 126 on the second portion 108b of the stacked ply assembly 108. Preferably, the desired location 126 (see FIG. 7) is a central location or substantially central location on the second portion 108b (see FIG. 7). However, the geometric shaped filler element 100, such as in the form of additional geometric shaped filler element 100c, may be positioned at another suitable desired location on the second portion 108b (see FIG. 7).

As shown in FIG. 7, the geometric shaped filler element 100, such as in the form of first geometric shaped filler element 100a, preferably deforms the second portion 108b of the stacked ply assembly 108 stacked over the first geometric shaped filler element 100a. This causes the plurality of stacks 110 (see FIG. 7) of laminate radius filler plies 110b (see FIG. 7) of the second portion 108b (see FIG. 7) to change direction. The plurality of stacks 110 (see FIG. 7) of laminate radius filler plies 110a (see FIG. 7) are oriented in the horizontal direction 118b (see FIG. 4B) and change direction or deform to laminate radius filler plies 110b (see FIG. 7) having a component of direction 116 (see FIG. 7) comprising the horizontal direction 118a and the vertical direction 118b (see FIG. 7).

As further shown in FIG. 7, the geometric shaped filler element 100, such as in the form of additional geometric shaped filler element 100c, preferably deforms an additional portion 108d of the stacked ply assembly 108 stacked over the additional geometric shaped filler element 100c. This causes the plurality of stacks 110 (see FIG. 7) of laminate radius filler plies 110d (see FIG. 7) of the additional portion 108d (see FIG. 7) to change direction. The laminate radius filler plies 110d (see FIG. 7) deform or bend to have a component of direction 116 (see FIG. 7) comprising the horizontal direction 118a (see FIG. 7) and the vertical direction 118b (see FIG. 7).

Preferably, changing the direction of the laminate radius filler plies 110b (see FIG. 7) of the second portion 108b (see FIG. 7) and changing the direction of the laminate radius filler plies 110d (see FIG. 7) of the additional portion 108d (see FIG. 7) both help to minimize a difference in CTE 136 (see FIG. 3) and interlaminar tension stress 138 (see FIG. 3) between the laminated composite radius filler 70 (see FIG. 7) and the wrap plies 84a, 84b (see FIG. 7) adjacent the laminated composite radius filler 70 (see FIG. 7). Minimizing the difference in CTE 136 (see FIG. 3) and interlaminar tension stress 138 (see FIG. 3) preferably eliminates delamination or results in a reduced delamination 140 (see FIG. 3) of the laminated composite radius filler 70 (see FIG. 7). Such delamination may result from thermal stresses that occur during the cure and thermal cycling stages of manufacture of the composite structure 28 (see FIG. 4B) and/or the composite assembly 26 (see FIG. 4B).

Thus, instead of being stacked in the horizontal direction 118a (see FIG. 4B) throughout the laminated composite radius filler 70 (see FIG. 7), the laminate radius filler plies 110b (see FIG. 7) stacked over the first geometric shaped filler element 100a (see FIG. 7) and the laminate radius filler plies 110d (see FIG. 7) stacked over the additional geometric shaped filler element 100c (see FIG. 7) both start deforming or bending to have a component of direction 116 (see FIG. 7) comprising the horizontal direction 118a (see FIG. 7) and the vertical direction 118b (see FIG. 7) to match or substantially match or follow the vertical direction 118b (see FIG. 4B) of the wrap plies 84a, 84b (see FIGS. 4B, 7) adjacent the laminated composite radius filler 70 (see FIG. 7).

This preferably minimizes the difference in the CTE 136 (see FIG. 3) between the laminated composite radius filler 70 (see FIG. 7) and the wrap plies 84a, 84b (see FIG. 7) adjacent the laminated composite radius filler 70 (see FIG. 7). This is because both the laminate radius filler plies 110b (see FIG. 7) and the laminate radius filler plies 110d (see FIG. 7) of the laminated composite radius filler 70 (see FIG. 7), and the wrap plies 84a, 84b (see FIG. 7), have the same or similar vertical orientation.

In addition, for the laminate radius filler plies 110b (see FIG. 7) stacked over the first geometric shaped filler element 100a (see FIG. 7), and for the laminate radius filler plies 110d (see FIG. 7) stacked over the additional geometric shaped filler element 100c (see FIG. 7), the radial orientation 114 (see FIG. 7) of the second portion 108b (see FIG. 7) and the additional portion 108d (see FIG. 7) of the laminated composite radius filler 70 (see FIG. 7) preferably substantially matches the radial orientation 86 (see FIG. 7) of the stacked composite plies 84 (see FIG. 7), such as wrap plies 84a, 84b (see FIG. 7).

In another embodiment of the disclosure, there is provided an aircraft composite assembly 26a (see FIGS. 1, 4B) for use in an aircraft 10 (see FIG. 1). The aircraft composite assembly 26a (see FIGS. 1, 4B) comprises a composite structure 28 (see FIGS. 1, 4B). The composite structure 28 (see FIG. 4B) comprises a radius filler region 72 (see FIG. 4B) and a plurality of wrap plies 84a, 84b, 92a (see FIG. 4B) adjacent the radius filler region 72 (see FIG. 4B).

The aircraft composite assembly 26a (see FIG. 4B) further comprises the laminated composite radius filler 70 (see FIG. 4B) having the configuration 74 (see FIG. 4B) substantially corresponding to the radius filler region 72 (see FIG. 4B) and filling the radius filler region 72 (see FIG. 4B). The laminated composite radius filler 70 (see FIG. 4B) comprises the stacked ply assembly 108 (see FIG. 4B). The stacked ply assembly 108 (see FIG. 4B) comprises the plurality of stacks 110 (see FIG. 4B) of laminate radius filler plies 110a (see FIG. 4B), 110b (see FIG. 4B), 110c (see FIG. 6), 110d (see FIG. 7), cut to a desired width 132 (see FIG. 3) and having a desired ply orientation 134 (see FIG. 3). Specifics of the stacked ply assembly 108 (see FIG. 4B) are discussed in detail above and apply equally to this embodiment of the aircraft composite assembly 26a (see FIG. 4B).

The laminated composite radius filler 70 (see FIG. 4B) further comprises the geometric shaped filler element 100 (see FIG. 4B) positioned at the desired location 120 (see FIG. 5) on the first portion 108a (see FIGS. 4B, 5) of the stacked ply assembly 108 (see FIG. 4B). The geometric shaped filler element 100 (see FIG. 4B) deforms the second portion 108b (see FIG. 4B) of the stacked ply assembly 108 (see FIG. 4B) stacked over the geometric shaped filler element 100 (see FIG. 4B), such that the laminate radius filler plies 110b (see FIG. 4B) of the second portion 108b (see FIG. 4B) of the stacked ply assembly 108 (see FIG. 4B) change direction and have a component of direction 116 (see FIG. 4B) comprising the horizontal direction 118a (see FIGS. 4B, 5) and the vertical direction 118b (see FIGS. 4B, 5).

The laminated composite radius filler 70 (see FIGS. 6-7) of the laminated composite radius filler 70 (see FIG. 4B) of the aircraft composite assembly 26a (see FIG. 4B) may further comprise one or more additional geometric shaped filler elements 100b (see FIG. 6), 100c (see FIG. 7). Each of the one or more additional geometric shaped filler elements 100b (see FIG. 6), 100c (see FIG. 7) may preferably be positioned at a desired location 124 (see FIG. 6) or a desired location 126 (see FIG. 7), respectively, in one or more additional portions 108c (see FIG. 6), 108d (see FIG. 7), respectively, of the stacked ply assembly 108 (see FIGS. 6-7). Further, each of the one or more additional geometric shaped filler elements 100b (see FIG. 6), 100c (see FIG. 7) further deforms one or more respective additional portions 108c (see FIG. 6), 108d (see FIG. 7) of the stacked ply assembly 108 (see FIGS. 6-7) stacked over the respective one or more additional geometric shaped filler elements 100b (see FIG. 6), 100c (see FIG. 7).

As discussed above, each geometric shaped filler element 100 (see FIGS. 5-7) is preferably comprised of a plurality of unidirectional fibers 101 (see FIG. 3), a unidirectional fiber tape, a prepreg unidirectional tape, a unidirectional composite tow, a slit unidirectional tape, a carbon fiber-reinforced plastic (CFRP) tape, a carbon fiber-reinforced plastic (CFRP) fabric, a prepreg fabric, a woven fabric including a woven carbon fiber fabric, chopped fiber, a combination thereof, or another suitable fiber material.

More preferably, each geometric shaped filler element 100 (see FIGS. 5-7) may be comprised of pultruded unidirectional fibers 101a (see FIG. 3) having a zero degree (0°) ply orientation. Preferably, the pultruded unidirectional fibers 101a (see FIG. 3) are formed using a pultrusion process and a pultrusion apparatus 130 (see FIG. 3), as discussed in further detail below.

As discussed above, the geometric shaped filler element 100 (see FIGS. 3, 4B, 5-7) preferably has a geometric shape 102 (see FIGS. 4B, 5-7). The geometric shape 102 (see FIGS. 4B, 5-7) may comprise one of a triangle shape 102a (see FIGS. 4B, 5), a triangle with curved corners shape 102b (see FIG. 6), an arrowhead shape 102c (see FIG. 7), a triangle with corners removed shape (not shown), a triangle with one or more curved sides shape (not shown), a radius filler shape (not shown), a half circle shape (not shown), or another suitable geometric shape.

The laminated composite radius filler 70 (see FIGS. 4B, 5) of the aircraft composite assembly 26a (see FIG. 4B) may further comprise a tip element 104 (see FIGS. 4B, 5) positioned on a top portion 122 (see FIG. 5) of the stacked ply assembly 108 (see FIG. 5), such as the top portion 122 (see FIG. 5) of the second portion 108b (see FIG. 5) of the stacked ply assembly 108 (see FIG. 5). The tip element 104 (see FIGS. 4B, 5) is preferably comprised of a plurality of unidirectional fibers, a unidirectional fiber tape, a prepreg unidirectional tape, a unidirectional composite tow, a slit unidirectional tape, a carbon fiber-reinforced plastic (CFRP) tape, a carbon fiber-reinforced plastic (CFRP) fabric, a prepreg fabric, a woven fabric including a woven carbon fiber fabric, chopped fiber, a combination thereof, or another suitable fiber material.

Preferably, changing the direction of the laminate radius filler plies 110b (see FIG. 5), 110c (see FIG. 6), 110d (see FIG. 7) of the respective second portion 108b (see FIG. 5), additional portion 108c (see FIG. 6), and/or additional portion 108d (see FIG. 7), minimizes a difference in CTE 136 (see FIG. 3) and interlaminar tension stress 138 (see FIG. 3) between the laminated composite radius filler 70 (see FIGS. 4B, 5) and wrap plies 84a, 84b (see FIGS. 4B, 5) adjacent the laminated composite radius filler 70 (see FIGS. 4B, 5). Minimizing the difference in CTE 136 (see FIG. 3) and interlaminar tension stress 138 (see FIG. 3) preferably eliminates delamination or results in a reduced delamination 140 (see FIG. 3) of the laminated composite radius filler 70 (see FIG. 7). Such delamination may result from thermal stresses that occur during the cure and thermal cycling stages of manufacture of the composite structure 28 (see FIG. 4B) and/or the composite assembly 26 (see FIG. 4B).

Figure 8:
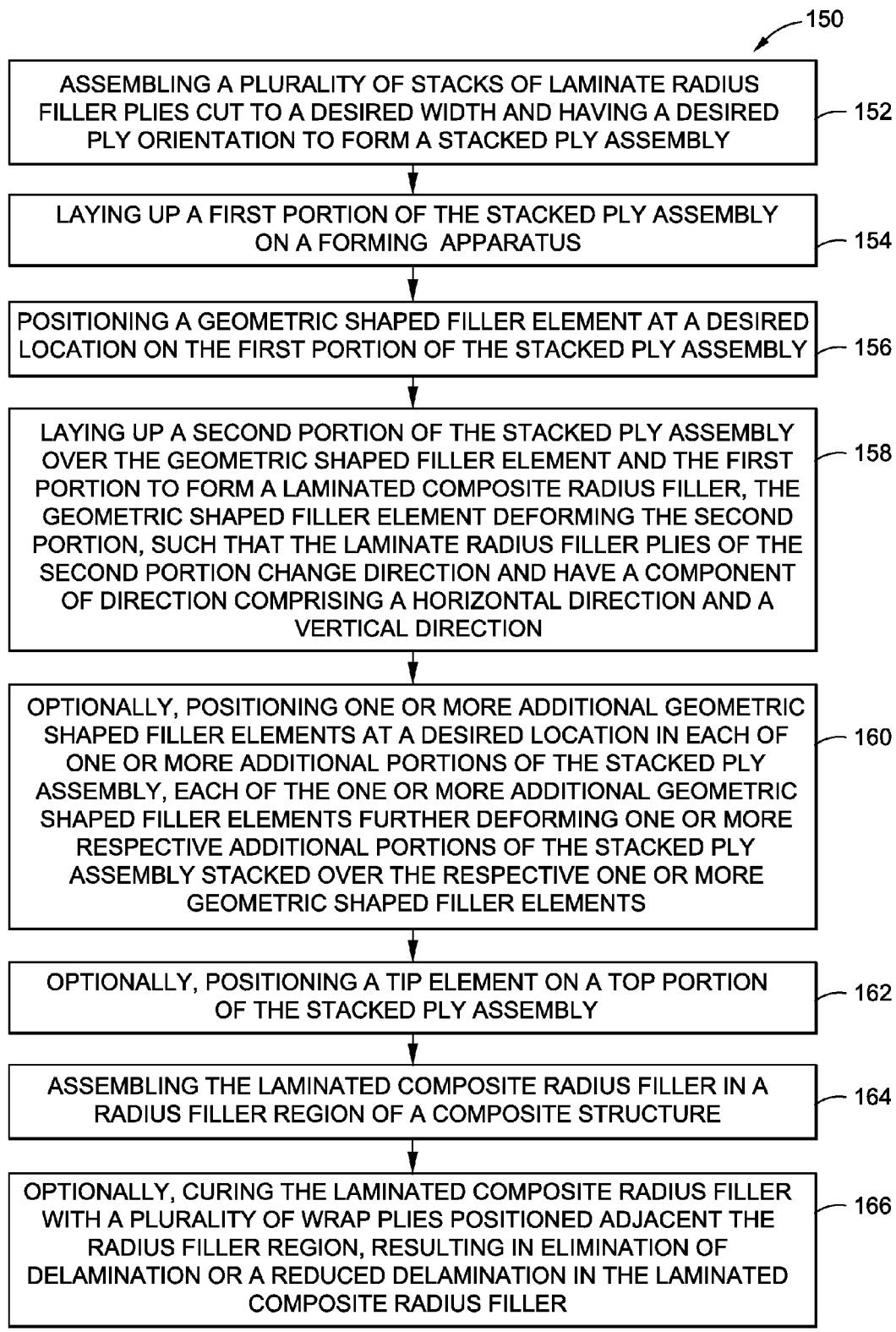

In another embodiment of the disclosure, there is provided a method 150 of forming a laminated composite radius filler 70 (see FIGS. 3, 4B, 5-7) for a composite structure 28 (see FIGS. 4A-4B). FIG. 8 is an illustration of a flow diagram of an exemplary embodiment of the method 150 of the disclosure. The steps listed for method 150 may be performed in an order other than that presented. Some steps may be performed simultaneously. Some steps may be optional or omitted. Steps other than those listed may be added.

The laminated composite radius filler 70 (see FIGS. 3, 4B, 5-7) may be formed of a composite material by any suitable means including, but not limited to, pultrusion, extrusion, hand lay up, automated lay up, or any other suitable forming process as described in greater detail below. The laminated composite radius filler 70 (see FIGS. 3, 4B, 5-7) is formed in order to fill the volume of and assume the shape and geometry of the radius filler region 72 (see FIGS. 3, 4A) to be filled. The configuration 74 (see FIGS. 4B, 5-7) of the laminated composite radius filler 70 (see FIGS. 4B, 5-7) may preferably comprise a substantially triangle shaped configuration and may preferably have a generally triangular cross-section. However, the laminated composite radius filler 70 may have another suitable configuration and cross-section shape.

As shown in FIG. 8, the method 150 comprises the step 152 of assembling a plurality of stacks 110 (see FIG. 3) of laminate radius filler plies 110a, 110b, 110c, 110d (see FIG. 3) cut to a desired width 132 (see FIG. 3) and having a desired ply orientation 134 (see FIG. 3) to form a stacked ply assembly 108 (see FIGS. 3, 4B, 5-7). The plurality of stacks 110 (see FIG. 3) of laminate radius filler plies 110a, 110b, 110c, 110d (see FIG. 3) may be debulked to compress or consolidate the plurality of stacks 110 (see FIG. 3) in order to remove voids, such as air or other gases, that may be trapped between layers of the plurality of stacks 110 (see FIG. 3).

As shown in FIG. 8, the method 150 further comprises the step 154 of laying up a first portion 108a (see FIGS. 3, 4B, 5-7) of the stacked ply assembly 108 (see FIGS. 3, 4B, 5-7) on a forming apparatus 128 (see FIG. 3). The forming apparatus 128 (see FIG. 3) may comprise a forming tool, a mold, a mandrel, a lay up machine platform, an automated fiber placement (AFP) machine, or another suitable forming apparatus. The laying up of the plurality of stacks 110 (see FIG. 3) on the forming apparatus 128 (see FIG. 3) may be conducted via a manual process or via an automated process, with a known lay up apparatus or machine.

The first portion 108a (see FIG. 3) of the stacked ply assembly 108 (see FIG. 3) may comprise a stack of three or four plies with preferably at least one ply having a zero degree (0°) ply orientation and the other plies having a +50 degree/−50 degree ply orientation or another desired ply orientation 134 (see FIG. 3). If an automated lay up process is used to form the stacked ply assembly 108 (see FIG. 3), the laminate radius filler plies 110a (see FIG. 4B) of the first portion 108a (see FIG. 3) may be laid up with single plies in any desired ply orientation 134 (see FIG. 3).

The plurality of stacks 110 (see FIGS. 3, 4B, 5-7) may be cut into strips from a ply charge with widths varying from large widths to small widths to conform to a radial orientation 114 (see FIGS. 5-7) of the laminated composite radius filler 70 (see FIGS. 5-7). The plurality of stacks 110 (see FIGS. 3, 4B, 5-7) may be cut using a known cutting device and a known cutting process, such as an ultrasonic cutting device and ultrasonic cutting process, a fabric cutting device and fabric cutting process, a laser cutting device and laser cutting process, or another suitable cutting device and cutting process.

The plurality of stacks 110 (see FIGS. 3, 4B, 5-7) may then be assembled, such as for example, starting with the widest stack and proceeding to a final stack over the one or more geometric shaped filler elements 100 (see FIGS. 4B, 5-7) to form the configuration 74 (see FIGS. 4B, 5-7) of the laminated composite radius filler 70 (see FIGS. 4B, 5-7).

As shown in FIG. 8, the method 150 further comprises the step 156 of positioning a geometric shaped filler element 100 (see FIGS. 3, 4B, 5-7), for example, at a desired location 120 (see FIG. 5) on the first portion 108a (see FIG. 5) of the stacked ply assembly 108 (see FIG. 5), at a desired location 124 (see FIG. 6) on the second portion 108b (see FIG. 6) of the stacked ply assembly 108 (see FIG. 6), and/or at a desired location 126 (see FIG. 7) on the second portion 108b (see FIG. 7) of the stacked ply assembly 108 (see FIG. 7). Preferably, the desired location 120 (see FIG. 5) is a central location 120a or substantially central location (see FIG. 5) on the first portion 108a (see FIG. 5). However, other suitable locations may also be used. Preferably, the desired location 124 and the desired location 126 are also central locations or substantially central locations. Preferably, one or more geometric shaped filler elements 100 (see FIGS. 3, 4B, 5-7) are positioned in the upper portion, such as the upper one-half portion or upper one-third portion, of the laminated composite radius filler 70 (see FIGS. 4B, 5-7).

The method 150 may further comprise before the step 156 of positioning the geometric shaped filler element 100 (see FIG. 5) at the desired location 120 (see FIG. 5), the step of forming the geometric shaped filler element 100 (see FIGS. 3, 4B, 5-7) from a material comprising a plurality of unidirectional fibers 101 (see FIG. 3), a unidirectional fiber tape, a prepreg unidirectional tape, a unidirectional composite tow, a slit unidirectional tape, a carbon fiber-reinforced plastic (CFRP) tape, a carbon fiber-reinforced plastic (CFRP) fabric, a prepreg fabric, a woven fabric including a woven carbon fiber fabric, chopped fiber, a combination thereof, or another suitable composite material.

The method 150 may further comprise before the step 156 of positioning the geometric shaped filler element 100 (see FIGS. 3, 4B, 5-7) at the desired location 120 (see FIG. 5), the step of further forming the geometric shaped filler element 100 (see FIGS. 3, 4B, 5-7) in a geometric shape 102 (see FIGS. 3, 4B, 5-7). The geometric shape 102 (see FIGS. 3, 4B, 5-7) may comprise one of a triangle shape 102a (see FIGS. 4B, 5), a triangle with curved corners shape 102b (see FIG. 6), an arrowhead shape 102c (see FIG. 7), a triangle with corners removed shape (not shown), a triangle with one or more curved sides shape (not shown), a radius filler shape (not shown), a half circle shape (not shown), or another suitable geometric shape.

The method 150 (see FIG. 8) may further comprise before the step 156 of positioning the geometric shaped filler element 100 (see FIG. 5) at the desired location 120 (see FIG. 5), the step of fabricating the geometric shaped filler element 100 (see FIG. 3). In one embodiment, the geometric shaped filler element 100 (see FIG. 3) may be fabricated with a known pultrusion process using a known pultrusion apparatus 130 (see FIG. 3). The known pultrusion process using the known pultrusion apparatus 130 (see FIG. 3) may be used to assemble a desired amount of unidirectional fibers 101 (see FIG. 3) having a zero degree (0°) ply orientation, such as in the form of unidirectional composite tow or slit tape, e.g., ⅛ inch wide, and to pull them through a heated die of a desired shape. The pultrusion process creates a consolidated, continuous composite profile of a geometric shaped filler element 100 (see FIG. 3) comprised of pultruded unidirectional fibers 101a (see FIG. 3). The geometric shaped filler element 100 (see FIG. 3) that has been pultruded may be used to make a fly away tool surface to lay up the laminate radius filler plies 110b, 110c, 110d (see FIG. 3) over. Alternatively, the geometric shaped filler element 100 (see FIG. 3) may be fabricated with another suitable method, for example, with chopped fiber and a mold.

As shown in FIG. 8, the method 150 further comprises the step 158 of laying up a second portion 108b (see FIGS. 3, 4B, 5-7) of the stacked ply assembly 108 (see FIGS. 3, 4B, 5-7) over the geometric shaped filler element 100 (see FIGS. 3, 4B, 5-7) and the first portion 108a (see FIGS. 3, 4B, 5-7) of the stacked ply assembly 108 (see FIGS. 3, 4B, 5-7) to form a laminated composite radius filler 70 (see FIGS. 3, 4B, 5-7). As shown in FIG. 5, the geometric shaped filler element 100 preferably deforms the second portion 108b of the stacked ply assembly 108, such that the laminate radius filler plies 110b of the second portion 108b change direction and have a component of direction 116 comprising the horizontal component 118a and the vertical component 118b.

As shown in FIG. 8, the method 150 further comprises optional step 160 of positioning one or more additional geometric shaped filler elements 100b (see FIG. 6), 100c (see FIG. 7), at a desired location 124 (see FIG. 6) or a desired location 126 (see FIG. 7), respectively, in each of one or more of the additional portion 108c (see FIG. 6) and/or the additional portion 108d (see FIG. 7), respectively, of the stacked ply assembly 108 (see FIG. 5). Each of the one or more additional geometric shaped filler elements 100b (see FIG. 6), 100c (see FIG. 7), may further deform one or more respective additional portions 108c (see FIG. 6), 108d (see FIG. 7), respectively, of the stacked ply assembly 108 (see FIG. 6) stacked over the respective one or more additional geometric shaped filler elements 100b (see FIG. 6), 100c (see FIG. 7).

As shown in FIG. 8, the method 150 further comprises optional step 162 of positioning a tip element 104 (see FIGS. 5, 6) on a top portion 122 (see FIGS. 5, 6) of the stacked ply assembly 108 (see FIGS. 5, 6), such as, for example, the top portion 122 (see FIG. 5) of the second portion 108b (see FIG. 5) of the stacked ply assembly 108 (see FIG. 5), or the top portion 122 (see FIG. 6) of the additional portion 108c (see FIG. 6) of the stacked ply assembly 108 (see FIG. 6). The tip element 104 (see FIGS. 5, 6) preferably comprises a plurality of unidirectional fibers 101 (see FIG. 3), a unidirectional fiber tape, a prepreg unidirectional tape, a unidirectional composite tow, a slit unidirectional tape, a carbon fiber-reinforced plastic (CFRP) tape, a carbon fiber-reinforced plastic (CFRP) fabric, a prepreg fabric, a woven fabric including a woven carbon fiber fabric, chopped fiber, a combination thereof, or another suitable fiber material.

In one embodiment, the tip element 104 (see FIGS. 5, 6) may be fabricated with a known pultrusion process using a known pultrusion apparatus 130 (see FIG. 3). The known pultrusion process using the known pultrusion apparatus 130 (see FIG. 3) may be used to assemble a desired amount of unidirectional fibers 101 (see FIG. 3) having a zero degree (0°) ply orientation, such as in the form of unidirectional composite tow or slit tape, e.g., ⅛ inch wide, and to pull them through a heated die of a desired shape. The pultrusion process creates a consolidated, continuous composite profile of a tip element 104 (see FIGS. 5, 6) comprised of pultruded unidirectional fibers 101a (see FIG. 3). Alternatively, the tip element 104 (see FIGS. 5, 6) may be fabricated with another suitable method, for example, with chopped fiber and a mold.

Once the tip element 104 (see FIGS. 5, 6) is fabricated, it may be positioned on a top portion 122 (see FIGS. 5, 6) the stacked ply assembly 108 (see FIGS. 5, 6), such as, for example, the top portion 122 (see FIG. 5) of the second portion 108b (see FIG. 5) of the stacked ply assembly 108 (see FIG. 5), or the top portion 122 (see FIG. 6) of the additional portion 108c (see FIG. 6) of the stacked ply assembly 108 (see FIG. 6), depending on how many geometric shaped filler elements 100 (see FIGS. 5, 6) are positioned in the laminated composite radius filler 70 (see FIGS. 5, 6).

As shown in FIG. 8, the method 150 further comprises the step 164 of assembling or installing the laminated composite radius filler 70 (see FIGS. 3, 4B, 5-7) in a radius filler region 72 (see FIGS. 3, 4A-4B) of a composite structure 28 (see FIGS. 3, 4A). The step 164 of assembling the laminated composite radius filler 70 (see FIGS. 3, 4B, 5-7) may further comprise assembling the laminated composite radius filler 70 (see FIGS. 3, 4B, 5-7) with a plurality of wrap plies 84a, 84b, 92a (see FIG. 4B) positioned adjacent the radius filler region 72 (see FIG. 4B).

As shown in FIG. 8, the method 150 may further comprise optional step 166 of curing the laminated composite radius filler 70 (see FIGS. 3, 4B, 5-7) with a plurality of wrap plies 84a, 84b, 92a (see FIG. 4B) positioned adjacent the radius filler region 72 (see FIG. 4B), resulting in elimination of delamination or a reduced delamination 140 (see FIG. 3) in the laminated composite radius filler 70 (see FIGS. 3, 4B, 5-7). The laminated composite radius filler 70 (see FIGS. 3, 4B, 5-7) and the wrap plies 84a, 84b, 92a (see FIG. 4B) of the composite structure 28 (see FIG. 4B) are preferably cured together under a suitable heat and pressure. The composite structure 28 may be further assembled into a composite assembly 26.

The step 166 of curing may optionally comprise placing the formed laminated composite radius filler 70 (see FIGS. 3, 4B, 5-7) in a full length die having a desired radius and shape and pressing the formed laminated composite radius filler 70 (see FIGS. 3, 4B, 5-7) in order to consolidate the laminated composite radius filler 70 (see FIGS. 3, 4B, 5-7). Alternatively, consolidation of the formed laminated composite radius filler 70 (see FIGS. 3, 4B, 5-7) in a die is not conducted.

The curing may comprise a known curing process such as an autoclave curing process, a vacuum bag curing process, a combination autoclave and vacuum bagging curing process, or another suitable curing process. The curing may preferably take place at an elevated temperature and pressure as required per material specifications to effectively cure the laminated composite radius filler 70 (see FIGS. 3, 4B, 5-7) and the composite structure 28 (see FIGS. 3, 4B) and/or the composite assembly 26 (see FIGS. 3, 4B). During curing, the composite material of the laminated composite radius filler 70 (see FIGS. 3, 4B, 5-7) hardens, and preferably holds the shape of the radius filler region 72 within the composite structure 28 and/or composite assembly 26. The composite structure 28 may be assembled into the composite assembly 26 and may be co-cured, such as in an autoclave under a pressure bagging process, or another suitable apparatus or process, as is known in the art.

In another embodiment, the laminated composite radius filler 70 (see FIGS. 3, 4B, 5-7) may be cured prior to assembling or installing into the radius filler region 72 (see FIG. 4A) of the composite structure 28 (see FIG. 4A) and/or the composite assembly 26 (see FIG. 4B), and the cured laminated composite radius filler 70 (see FIGS. 3, 4B, 5-7) may be bonded or co-bonded within the radius filler region 72 of a cured or uncured composite structure 28 and/or composite assembly 26 via adhesive bonding, co-curing, secondary bonding, or another known bonding or co-bonding process. The bonding process may take place at an elevated temperature and pressure, as required per material specifications, to effectively bond or co-bond the cured laminated composite radius filler 70 (see FIGS. 3, 4B, 5-7) within the radius filler region 72 of a cured or uncured composite structure 28 and/or composite assembly 26. For example, the composite structure 28 (see FIG. 4B) comprising the laminated composite radius filler 70 (see FIG. 4B) and the wrap plies 84a, 84b, 92a (see FIG. 4B) may be separately cured and then may be bonded to a fully cured skin panel 96 (see FIG. 4B) in order to form a composite assembly 26 (see FIG. 4B) suitable for use, for example, in the wings 18 (see FIG. 1) of an aircraft 10 (see FIG. 1).

As will be appreciated by those of skill in the art, incorporating the laminated composite radius filler 70 (see FIGS. 3, 4B, 5-7), such as in the form of laminated composite radius filler 70a (see FIGS. 3, 4B, 5), laminated composite radius filler 70b (see FIG. 6), or laminated composite radius filler 70c (see FIG. 7), formed by embodiments of the disclosed method 150 (see FIG. 8), into composite structures 28 (see FIGS. 1, 4A), e.g., wings 18 (see FIG. 1) of an aircraft 10 (see FIG. 1), results in a number of substantial benefits. Disclosed embodiments of the laminated composite radius filler 70 (see FIGS. 3, 4B, 5-7) and method 150 (see FIG. 8) use one or more geometric shaped filler elements 100 (see FIGS. 3, 4B, 5-7) to minimize the difference in the coefficient of thermal expansion (CTE) 136 (see FIG. 3) and interlaminar tension stress 138 (see FIG. 3). This may be minimized by changing the direction of the laminate radius filler plies 110*b* (see FIG. 5), 110*c* (see FIG. 6), and/or 110*d* (see FIG. 7) of the respective second portion 108*b* (see FIG. 5), additional portion 108*c* (see FIG. 6), and additional portion 108*d* (see FIG. 7), so that they have a component of direction 116 (see FIG. 3) comprising the horizontal component 118*a* (see FIG. 3) and the vertical component 118*b* (see FIG. 3). The improved minimization in the difference in CTE 136 (see FIG. 3) and interlaminar tension stress 138 (see FIG. 3) may be optimized by changing the size and shape of each geometric shaped filler element 100 (see FIGS. 3, 4B, 5-7) and the location of each geometric shaped filler element 100 (see FIGS. 3, 4B, 5-7) within the laminated composite radius filler 70 (see FIGS. 3, 4B, 5-7).

In addition, disclosed embodiments of the laminated composite radius filler 70 (see FIGS. 3, 4B, 5-7) and method 150 (see FIG. 8) provide a solution to the occurrence of delamination during cure and thermal cycling stages of manufacture of certain existing laminated composite radius fillers, for example, certain laminated composite radius fillers in stringers of aircraft, while continuing to allow for the use of laminated composite radius fillers, which may have advantages in various applications over other types of radius fillers. The use of the one or more geometric shaped filler elements 100 (see FIGS. 3, 4B, 5-7) in the laminated composite radius filler 70 (see FIGS. 3, 4B, 5-7) may eliminate or reduce delamination in the laminated composite radius filler 70 (see FIGS. 3, 4B, 5-7). Such delamination may result from thermal stresses that occur during cure and thermal cycling stages of manufacture. The improved design may reduce the interlaminar tension stress 138 (see FIG. 3) in the laminated composite radius filler 70 (see FIGS. 3, 4B, 5-7). In turn, a reduction of residual interlaminar tension stress 138 (see FIG. 3) may also improve a pull-off strength or capability of the laminated composite radius filler 70 (see FIGS. 3, 4B, 5-7). By reducing residual interlaminar tension stress 138 (see FIG. 3) in the laminated composite radius filler 70 (see FIGS. 3, 4B, 5-7), the laminated composite radius filler 70 (see FIGS. 3, 4B, 5-7) may be better able to handle loads transmitted to the laminated composite radius filler 70 (see FIGS. 3, 4B, 5-7). In addition, the laminate radius filler plies 110*b*, 110*c*, 110*d* (see FIG. 3) that may be deformed by the one or more geometric shaped filler elements 100 (see FIGS. 3, 4B, 5-7) may be bent out-of-plane with the pull-off load and can thus react the pull-off-load.

Moreover, disclosed embodiments of the laminated composite radius filler 70 (see FIGS. 3, 4B, 5-7) and method 150 (see FIG. 8) provide for a plurality of stacks 110 (see FIG. 3) of laminate radius filler plies 110*a*, 110*b*, 110*c*, 110*d* (see FIG. 3) that may be tailorable to have any desired ply orientation, as opposed to requiring only use of plies with a zero degree (0°) ply orientation. In addition, preferably the stacked ply assembly 108 (see FIGS. 3, 4B, 5-7) in the upper portion of the laminated composite radius filler 70 (see FIGS. 3, 4B, 5-7), where delamination or crack formation typically starts, may be deformed or shaped by the one or more geometric shaped filler elements 100 (see FIGS. 3, 4B, 5-7) to bend to have a component of direction comprising the horizontal direction 118*a* (see FIGS. 5-7) and the vertical direction 118*b* (see FIGS. 5-7), so as to substantially match the vertical direction 118*b* (see FIG. 4B) of the wrap plies 84*a*, 84*b* (see FIG. 4B) adjacent the laminated composite radius filler 70 (see FIGS. 3, 4B, 5-7). By changing the direction of the stacked ply assembly 108 (see FIGS. 3, 4B, 5-7) in the upper portion of the laminated composite radius filler 70 (see FIGS. 3, 4B, 5-7) to more closely align with the direction of the wrap plies 84*a*, 84*b* (see FIG. 4B) adjacent the laminated composite radius filler 70 (see FIGS. 3, 4B, 5-7), the difference in the CTE 136 (see FIG. 3) of the laminated composite radius filler 70 (see FIGS. 3, 4B, 5-7) and of the wrap plies 84*a*, 84*b* (see FIG. 4B) adjacent the laminated composite radius filler 70 (see FIGS. 3, 4B, 5-7) may be minimized.

Further, disclosed embodiments of the laminated composite radius filler 70 (see FIGS. 3, 4B, 5-7) and method 150 (see FIG. 8) may provide for a geometric shaped filler element 100 (see FIG. 3) that has been pultruded via a pultrusion process using a pultrusion apparatus 130 (see FIG. 3) and that is comprised of pultruded unidirectional fibers 101*a* (see FIG. 3). Such geometric shaped filler element 100 (see FIG. 3) preferably has a geometric shape 102 (see FIG. 4B) in the form of a triangle shape 102*a* (see FIG. 4B) to create a fly away tool surface to lay up the laminate radius filler plies 110*b*, 110*c*, 110*d* (see FIG. 3) over.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. A laminated composite radius filler for a composite structure comprising:
   a stacked ply assembly comprising a plurality of stacks of laminate radius filler plies cut to a desired width and having a desired ply orientation; and,
   a separate, pre-formed geometric shaped filler element comprising a plurality of plies comprised of a plurality of unidirectional fibers, a unidirectional fiber tape, a prepreg unidirectional tape, a unidirectional composite tow, a slit unidirectional tape, a carbon fiber-reinforced plastic (CFRP) tape, a carbon fiber-reinforced plastic (CFRP) fabric, a prepreg fabric, a woven fabric including a woven carbon fiber fabric, or a combination thereof, the geometric shaped filler element positioned within the laminated composite radius filler at a desired location on a first portion of the stacked ply assembly, the geometric shaped filler element deforming a second portion of the stacked ply assembly stacked over the geometric shaped filler element, such that the laminate radius filler plies of the second portion of the stacked ply assembly change direction and have a component of direction comprising a horizontal direction and a vertical direction, the laminated composite radius filler having a shape substantially corresponding to a radius filler region of the composite structure and filling the radius filler region.

2. The laminated composite radius filler of claim 1 further comprising a tip element positioned on a top portion of the stacked ply assembly, the tip element comprising a plurality of unidirectional fibers, a unidirectional fiber tape, a prepreg unidirectional tape, a unidirectional composite tow, a slit unidirectional tape, a carbon fiber-reinforced plastic (CFRP) tape, a carbon fiber-reinforced plastic (CFRP) fabric, a prepreg fabric, a woven fabric including a woven carbon fiber fabric, chopped fiber, or a combination thereof.

3. The laminated composite radius filler of claim 1 further comprising one or more additional geometric shaped filler elements, each positioned at a desired location on one or more additional portions of the stacked ply assembly, and each of the one or more additional geometric shaped filler elements further deforming one or more respective additional portions of the stacked ply assembly stacked over the respective one or more geometric shaped filler elements.

4. The laminated composite radius filler of claim 1 wherein the geometric shaped filler element comprises chopped fiber.

5. The laminated composite radius filler of claim 1 wherein the geometric shaped filler element is comprised of pultruded unidirectional fibers having a zero degree (0°) ply orientation.

6. The laminated composite radius filler of claim 1 wherein the geometric shaped filler element has a geometric shape comprising one of a triangle shape, a triangle with curved corners shape, an arrowhead shape, a triangle with corners removed shape, a triangle with one or more curved sides shape, a radius filler shape, and a half circle shape.

7. The laminated composite radius filler of claim 1 wherein changing the direction of the laminate radius filler plies of the second portion minimizes a difference in coefficient of thermal expansion (CTE) and interlaminar tension stress between the laminated composite radius filler and a plurality of wrap plies adjacent the laminated composite radius filler.

8. The laminated composite radius filler of claim 1 wherein the geometric shaped filler element is positioned in an upper one-half portion of the laminated composite radius filler.

9. An aircraft composite assembly comprising:
  a composite structure comprising a radius filler region and a plurality of wrap plies adjacent the radius filler region; and,
  a laminated composite radius filler having a shape substantially corresponding to the radius filler region and filling the radius filler region, the laminated composite radius filler comprising:
    a stacked ply assembly comprising a plurality of stacks of laminate radius filler plies cut to a desired width and having a desired ply orientation; and,
    a separate, pre-formed geometric shaped filler element comprising a plurality of plies comprised of a plurality of unidirectional fibers, a unidirectional fiber tape, a prepreg unidirectional tape, a unidirectional composite tow, a slit unidirectional tape, a carbon fiber-reinforced plastic (CFRP) tape, a carbon fiber-reinforced plastic (CFRP) fabric, a prepreg fabric, a woven fabric including a woven carbon fiber fabric, or a combination thereof, the geometric shaped filler element positioned within the laminated composite radius filler at a desired location on a first portion of the stacked ply assembly, the geometric shaped filler element deforming a second portion of the stacked ply assembly stacked over the geometric shaped filler element, such that the laminate radius filler plies of the second portion of the stacked ply assembly change direction and have a component of direction comprising a horizontal direction and a vertical direction.

10. The aircraft composite assembly of claim 9 wherein the laminated composite radius filler further comprises a tip element positioned on a top portion of the stacked ply assembly, the tip element comprising a plurality of unidirectional fibers, a unidirectional fiber tape, a prepreg unidirectional tape, a unidirectional composite tow, a slit unidirectional tape, a carbon fiber-reinforced plastic (CFRP) tape, a carbon fiber-reinforced plastic (CFRP) fabric, a prepreg fabric, a woven fabric including a woven carbon fiber fabric, chopped fiber, or a combination thereof.

11. The aircraft composite assembly of claim 9 wherein the laminated composite radius filler further comprises one or more additional geometric shaped filler elements, each positioned at a desired location on one or more additional portions of the stacked ply assembly, and each of the one or more additional geometric shaped filler elements further deforming one or more respective additional portions of the stacked ply assembly stacked over the respective one or more geometric shaped filler elements.

12. The aircraft composite assembly of claim 9 wherein the geometric shaped filler element comprises chopped fiber.

13. The aircraft composite assembly of claim 9 wherein the geometric shaped filler element has a geometric shape comprising one of a triangle shape, a triangle with curved corners shape, an arrowhead shape, a triangle with corners removed shape, a triangle with one or more curved sides shape, a radius filler shape, and a half circle shape.

14. The aircraft composite assembly of claim 9 wherein changing the direction of the laminate radius filler plies of the second portion minimizes a difference in coefficient of thermal expansion (CTE) and interlaminar tension stress between the laminated composite radius filler and the plurality of wrap plies adjacent the laminated composite radius filler, resulting in elimination of delamination or a reduced delamination in the laminated composite radius filler.

15. A laminated composite radius filler for a composite structure comprising:
  a stacked ply assembly comprising a plurality of stacks of laminate radius filler plies cut to a desired width and having a desired ply orientation; and,
  a separate, pre-formed geometric shaped filler element comprising a plurality of plies comprised of a plurality of unidirectional fibers, a unidirectional fiber tape, a prepreg unidirectional tape, a unidirectional composite tow, a slit unidirectional tape, a carbon fiber-reinforced plastic (CFRP) tape, a carbon fiber-reinforced plastic (CFRP) fabric, a prepreg fabric, a woven fabric including a woven carbon fiber fabric, or a combination thereof, the geometric shaped filler element positioned within the stacked ply assembly at a desired location on a first portion of the stacked ply assembly, the geometric shaped filler element deforming a second portion of the stacked ply assembly stacked over the geometric shaped filler element, such that the laminate radius filler plies of the second portion of the stacked ply assembly change direction and have a component of direction comprising a horizontal direction and a vertical direction, the laminated composite radius filler having a shape substantially corresponding to a radius filler region of the composite structure and filling the radius filler region.

16. The laminated composite radius filler of claim 15 further comprising a tip element positioned on a top portion of the stacked ply assembly, the tip element comprising a plurality of unidirectional fibers, a unidirectional fiber tape, a prepreg unidirectional tape, a unidirectional composite tow, a slit unidirectional tape, a carbon fiber-reinforced plastic (CFRP) tape, a carbon fiber-reinforced plastic (CFRP) fabric, a prepreg fabric, a woven fabric including a woven carbon fiber fabric, chopped fiber, or a combination thereof.

17. The laminated composite radius filler of claim 15 further comprising one or more additional geometric shaped filler elements, each positioned at a desired location on one or more additional portions of the stacked ply assembly, and each of the one or more additional geometric shaped filler elements further deforming one or more respective additional portions of the stacked ply assembly stacked over the respective one or more geometric shaped filler elements.

18. The laminated composite radius filler of claim 15 wherein the geometric shaped filler element comprises chopped fiber.

19. The laminated composite radius filler of claim 15 wherein changing the direction of the laminate radius filler plies of the second portion minimizes a difference in coefficient of thermal expansion (CTE) and interlaminar tension stress between the laminated composite radius filler and a plurality of wrap plies adjacent the laminated composite radius filler.

20. The laminated composite radius filler of claim 15 wherein the geometric shaped filler element is positioned in an upper one-half portion of the laminated composite radius filler.

21. A method of forming a laminated composite radius filler for a composite structure, the method comprising the steps of:
assembling a plurality of stacks of laminate radius filler plies cut to a desired width and having a desired ply orientation to form a stacked ply assembly;
laying up a first portion of the stacked ply assembly on a forming apparatus;
positioning a separate, pre-formed geometric shaped filler element comprising a plurality of plies comprised of a plurality of unidirectional fibers, a unidirectional fiber tape, a prepreg unidirectional tape, a unidirectional composite tow, a slit unidirectional tape, a carbon fiber-reinforced plastic (CFRP) tape, a carbon fiberreinforced plastic (CFRP) fabric, a prepreg fabric, a woven fabric including a woven carbon fiber fabric, or a combination thereof, within the laminated composite radius filler at a desired location on the first portion of the stacked ply assembly;
laying up a second portion of the stacked ply assembly over the geometric shaped filler element and the first portion to form the laminated composite radius filler, the geometric shaped filler element deforming the second portion, such that the laminate radius filler plies of the second portion change direction and have a component of direction comprising a horizontal direction and a vertical direction; and,
assembling the laminated composite radius filler in a radius filler region of a composite structure and filling the radius filler region.

22. The method of claim 21 further comprising before the step of assembling the laminated composite radius filler in the radius filler region of the composite structure, the step of positioning one or more additional geometric shaped filler elements at a desired location in each of one or more additional portions of the stacked ply assembly, each of the one or more additional geometric shaped filler elements further deforming one or more respective additional portions of the stacked ply assembly stacked over the respective one or more geometric shaped filler elements.

23. The method of claim 21 further comprising before the step of assembling the laminated composite radius filler in the radius filler region of the composite structure, the step of positioning a tip element on a top portion of the stacked ply assembly, the tip element comprising a plurality of unidirectional fibers, a unidirectional fiber tape, a prepreg unidirectional tape, a unidirectional composite tow, a slit unidirectional tape, a carbon fiber-reinforced plastic (CFRP) tape, a carbon fiber-reinforced plastic (CFRP) fabric, a prepreg fabric, a woven fabric including a woven carbon fiber fabric, chopped fiber, or a combination thereof.

24. The method of claim 21 further comprising after the step of assembling the laminated composite radius filler in the radius filler region of the composite structure, the step of curing the laminated composite radius filler with a plurality of wrap plies positioned adjacent the radius filler region, resulting in elimination of delamination or a reduced delamination in the laminated composite radius filler.

25. The method of claim 21 further comprising before the step of positioning the geometric shaped filler element at the desired location, the step of forming the geometric shaped filler element in a geometric shape comprising one of a triangle shape, a triangle with curved corners shape, an arrowhead shape, a triangle with corners removed shape, a triangle with one or more curved sides shape, a radius filler shape, and a half circle shape.

26. The method of claim 21 further comprising before the step of positioning the geometric shaped filler element at the desired location, the step of pultruding unidirectional fibers having a zero degree (0°) ply orientation via a pultrusion process to form the geometric shaped filler element.

* * * * *